US008751291B2

(12) United States Patent
Zaher et al.

(10) Patent No.: US 8,751,291 B2
(45) Date of Patent: Jun. 10, 2014

(54) ECONOMIC ANALYSIS OF GRID INFRASTRUCTURE

(75) Inventors: Neal Lewis Zaher, Atlanta, GA (US); Richard Patrick Joyce, Jr., Suwanee, GA (US); Richard Scott Snow, Ponte Vedra Beach, FL (US)

(73) Assignee: General Electric Comany, Schenectady, NY (US)

( * ) Notice: Subject to any disclaimer, the term of this patent is extended or adjusted under 35 U.S.C. 154(b) by 0 days.

(21) Appl. No.: 13/344,554

(22) Filed: Jan. 5, 2012

(65) Prior Publication Data
US 2013/0179202 A1 Jul. 11, 2013

(51) Int. Cl.
*G06Q 10/00* (2012.01)
*G06Q 30/00* (2012.01)
*G06F 17/00* (2006.01)
*G06Q 10/06* (2012.01)
*G06Q 50/06* (2012.01)
*G06Q 40/00* (2012.01)
*G06Q 10/08* (2012.01)

(52) U.S. Cl.
CPC .......... *G06Q 10/06375* (2013.01); *G06Q 50/06* (2013.01); *G06Q 40/10* (2013.01); *G06Q 10/0875* (2013.01); *G06Q 10/0637* (2013.01); *G06Q 10/0639* (2013.01); *G06Q 10/06315* (2013.01)
USPC .............. 705/7.37; 705/412; 705/30; 705/29; 705/7.36; 705/7.38; 705/7.39; 705/7.25; 705/286

(58) Field of Classification Search
CPC ............ G06Q 10/06375; G06Q 10/06; G06Q 10/067; G06Q 10/08; G06Q 50/06; G06Q 50/00; G06Q 90/00; G05B 13/02; G05B 13/04
USPC ......... 705/7.37, 412, 30, 29, 7.36, 7.38, 7.39, 705/7.25, 500; 700/286, 295; 60/274; 702/64, 60; 455/456.1
See application file for complete search history.

(56) References Cited

U.S. PATENT DOCUMENTS

| | | | | | |
|---|---|---|---|---|---|
| 5,287,267 | A | * | 2/1994 | Jayaraman et al. | 705/7.31 |
| 6,006,192 | A | * | 12/1999 | Cheng et al. | 705/7.31 |
| 6,088,688 | A | * | 7/2000 | Crooks et al. | 705/412 |
| 6,138,103 | A | * | 10/2000 | Cheng et al. | 705/7.37 |
| 6,343,277 | B1 | * | 1/2002 | Gaus et al. | 705/37 |
| 6,456,982 | B1 | * | 9/2002 | Pilipovic | 705/36 R |
| 6,546,375 | B1 | * | 4/2003 | Pang et al. | 705/37 |
| 6,868,293 | B1 | * | 3/2005 | Schurr et al. | 700/22 |
| 7,305,281 | B2 | * | 12/2007 | Scott et al. | 700/286 |
| 7,359,878 | B2 | * | 4/2008 | Peljto et al. | 705/37 |
| 8,117,653 | B1 | * | 2/2012 | Hickey | 726/21 |
| 8,232,676 | B2 | * | 7/2012 | Gurunathan et al. | 307/66 |

(Continued)

*Primary Examiner* — Justin M Pats
*Assistant Examiner* — Octavian Rotaru
(74) *Attorney, Agent, or Firm* — Fletcher Yoder, P.C.

(57) ABSTRACT

A method and a system for analyzing infrastructure are provided. In one embodiment, a system for analyzing infrastructure is provided. The system includes a grid intelligence quotient as a service (GIQAAS) system. The GIQAAS system includes an infrastructure data gathering system having a first input form configured to collect an economic data related to an infrastructure. The GIQAAS system further includes an economic modeling system configured to import the economic data and to derive an economic analysis based on the economic data. The GIQAAS system is configured to provide the infrastructure data gathering system to a first user for collection of the economic data, and to provide the economic modeling system to a second user for derivation of the economic analysis.

17 Claims, 13 Drawing Sheets

(56) References Cited

U.S. PATENT DOCUMENTS

| | | | |
|---|---|---|---|
| 2002/0007388 A1* | 1/2002 | Bannai et al. | 709/104 |
| 2002/0019758 A1* | 2/2002 | Scarpelli | 705/7 |
| 2002/0032644 A1* | 3/2002 | Corby et al. | 705/37 |
| 2002/0049667 A1* | 4/2002 | Navani et al. | 705/37 |
| 2002/0069210 A1* | 6/2002 | Navani et al. | 707/104.1 |
| 2002/0103738 A1* | 8/2002 | Griebel et al. | 705/36 |
| 2003/0014355 A1* | 1/2003 | Browne et al. | 705/38 |
| 2003/0023467 A1* | 1/2003 | Moldovan | 705/7 |
| 2003/0055677 A1* | 3/2003 | Brown et al. | 705/1 |
| 2003/0093345 A1* | 5/2003 | Cutbirth | 705/35 |
| 2003/0101062 A1* | 5/2003 | Taber, Jr. | 705/1 |
| 2003/0216971 A1* | 11/2003 | Sick et al. | 705/26 |
| 2004/0034584 A1* | 2/2004 | Cory et al. | 705/35 |
| 2004/0215529 A1* | 10/2004 | Foster et al. | 705/26 |
| 2004/0215545 A1* | 10/2004 | Murakami et al. | 705/36 |
| 2004/0225556 A1* | 11/2004 | Willen et al. | 705/10 |
| 2004/0225648 A1* | 11/2004 | Ransom et al. | 707/3 |
| 2005/0137956 A1* | 6/2005 | Flory et al. | 705/37 |
| 2006/0036448 A1* | 2/2006 | Haynie et al. | 705/1 |
| 2006/0047369 A1* | 3/2006 | Brewster et al. | 700/291 |
| 2006/0161450 A1* | 7/2006 | Carey et al. | 705/1 |
| 2007/0005195 A1* | 1/2007 | Pasquale et al. | 700/295 |
| 2007/0185729 A1* | 8/2007 | Segerman | 705/1 |
| 2008/0015742 A1* | 1/2008 | Kulyk et al. | 700/295 |
| 2008/0049013 A1* | 2/2008 | Nasle | 345/419 |
| 2008/0120251 A1* | 5/2008 | Tyagi et al. | 705/36 R |
| 2008/0167756 A1* | 7/2008 | Golden et al. | 700/297 |
| 2008/0183523 A1* | 7/2008 | Dikeman | 705/7 |
| 2008/0228518 A1* | 9/2008 | Braziel et al. | 705/1 |
| 2008/0229226 A1* | 9/2008 | Rowbottom et al. | 715/771 |
| 2008/0270283 A1* | 10/2008 | Boni et al. | 705/37 |
| 2009/0012918 A1* | 1/2009 | Aron et al. | 705/412 |
| 2009/0295594 A1* | 12/2009 | Yoon | 340/825.36 |
| 2009/0326726 A1* | 12/2009 | Ippolito et al. | 700/291 |
| 2010/0106575 A1* | 4/2010 | Bixby et al. | 705/14.11 |
| 2010/0257124 A1* | 10/2010 | Srinivasan | 705/36 T |
| 2011/0016017 A1* | 1/2011 | Carlin et al. | 705/26.4 |

* cited by examiner

CUSTOMER VALUE ANALYSIS INPUT SHEET

| | DESCRIPTION | CUSTOMER | COMMENTS |
|---|---|---|---|
| 5 | CUSTOMER NAME | DEMO | CUSTOMER NAME |
| 6 | CONTRACT START DATE | 12/1/2012 | CONTRACT START DATE |
| 7 | TERM (MONTHS) | 120 | TERM LENGTH IN MONTHS |
| 8 | COST PER TRUCK ROLL | $ 80.00 | UTILITY COST TO DEPLOY MAINTENANCE TRUCK PER EVENT |
| 9 | RECONNECT CHARGE | $ 50.00 | COST TO PERFORM RECONNECT OF PREVIOUSLY DISCONNECTED ENDPOINT |
| 10 | CARRY COST OF POST-PAY | 2.00% | % OF TOTAL COST TO CARRY CAPITAL FOR POST-PAY |
| 11 | BAD DEBT (MONTHLY) | 3.00% | % BAD/DEFAULT CUSTOMER DEBT |
| 12 | INFLATION | 2.00% | AVERAGE EXPECTED INFLATION |
| 13 | DISCOUNT RATE | 3.00% | HURDLE (DISCOUNT) RATE USED IN NET PRESENT VALUE CALCULATIONS |
| 14 | RESIDENTIAL ELECTRIC | TRUE | ENTER "TRUE" IS RESIDENTIAL ELECTRIC METERS ARE INCLUDED |
| 15 | RESIDENTIAL WATER | TRUE | ENTER "TRUE" IS RESIDENTIAL WATER METERS ARE INCLUDED |
| 16 | RESIDENTIAL GAS | FALSE | ENTER "TRUE" IS RESIDENTIAL GAS METERS ARE INCLUDED |
| 17 | ENDPOINTS (ELECTRIC) | 10,000 | TOTAL NUMBER OF ELECTRIC ENDPOINTS |
| 18 | AVG CONSUMER MONTHLY BILL (ELECTRIC) | $ 76.75 | AVERAGE MONTHLY ELECTRIC BILL ACROSS SERVICE AREA |
| 19 | COST PER BILL (ELECTRIC) | 76.00 | COST TO GENERATE BILL INCLUDING METER READS |
| 20 | MONTHLY DISCONNECT RATE (ELECTRIC) | 7.10% | AVERAGE MONTHLY DISCONNECTS |
| 21 | HIGH RISK PERCENT (ELECTRIC) | 1.69% | % HIGH-RISK ENDPOINTS |
| 22 | PERCENT LOSS (ELECTRIC) | 0.00% | % ELECTRIC LOSS |
| 23 | ENDPOINTS (WATER) | 5,000 | TOTAL NUMBER OF WATER ENDPOINTS |
| 24 | AVG CONSUMER MONTHLY BILL (WATER) | $ 78.00 | AVERAGE MONTHLY WATER BILL ACROSS SERVICE AREA |
| 25 | COST PER BILL (WATER) | 1.05 | COST TO GENERATE BILL INCLUDING METER READS |
| 26 | MONTHLY DISCONNECT RATE (WATER) | 0.00% | AVERAGE MONTHLY DISCONNECTS |
| 27 | HIGH RISK PERCENT (WATER) | 1.69% | % HIGH-RISK ENDPOINTS |
| 28 | PERCENT LOSS (WATER) | 8.00% | % WATER LOSS |
| 29 | ENDPOINTS (GAS) | 0 | TOTAL NUMBER OF GAS ENDPOINTS |
| 30 | AVG CONSUMER MONTHLY BILL (GAS) | $ - | AVERAGE MONTHLY GAS BILL ACROSS SERVICE AREA |
| 31 | COST PER BILL (GAS) | $ - | COST TO GENERATE BILL INCLUDING METER READS |
| 32 | MONTHLY DISCONNECT RATE (GAS) | 0.00% | AVERAGE MONTHLY DISCONNECTS |
| 33 | HIGH RISK PERCENT (GAS) | 0.00% | % HIGH-RISK ENDPOINTS |
| 34 | PERCENT LOSS (GAS) | 0.00% | % GAS LOSS |

FIG. 2

CAPEX COST/BENEFIT INPUT SHEET

| # | BENEFIT INCLUDED? | DESCRIPTION | BENEFIT ROLLOUT | COST | RECURRING | CATEGORY | E | W | G |
|---|---|---|---|---|---|---|---|---|---|
| 1 | TRUE | METER READING COST REDUCTION-ELECTRIC | $ 3.00 | $ - | TRUE | AMI | TRUE | FALSE | FALSE |
| 2 | FALSE | METER READING COST REDUCTION-WATER | $ 2.00 | $ - | TRUE | AMI | FALSE | FALSE | FALSE |
| 3 | FALSE | METER READING COST REDUCTION-GAS | $ 3.00 | $ - | TRUE | AMI | FALSE | FALSE | FALSE |
| 4 | FALSE | WATER METER COMMS | $ - | $ 100.00 | FALSE | AMI | FALSE | FALSE | FALSE |
| 5 | FALSE | GAS METER COMMS | $ - | $ 100.00 | FALSE | AMI | FALSE | FALSE | FALSE |
| 6 | TRUE | AMI ANNUAL SUPPORT | $ - | $ 2.53 | TRUE | AMI | TRUE | FALSE | FALSE |
| 7 | TRUE | ELECTRIC METER REPLACEMENT COST | $ - | $ 500.00 | FALSE | AMI | TRUE | FALSE | FALSE |
| 8 | FALSE | WATER METER REPLACEMENT COST | $ - | $ 350.00 | FALSE | AMI | FALSE | FALSE | FALSE |
| 9 | FALSE | GAS METER REPLACEMENT COST | $ - | $ 300.00 | FALSE | AMI | FALSE | FALSE | FALSE |
| 10 | TRUE | AMI SW & INTEGRATION | $ - | $ 10.00 | FALSE | AMI | TRUE | FALSE | FALSE |
| 11 | FALSE | CIS BENEFIT | $ 5.00 | $ - | TRUE | CIS | FALSE | FALSE | FALSE |
| 12 | FALSE | CIS SW & INTEGRATION | $ - | $ - | FALSE | CIS | FALSE | FALSE | FALSE |
| 13 | FALSE | CIS ANNUAL SUPPORT | $ - | $ - | TRUE | CIS | FALSE | FALSE | FALSE |
| 14 | TRUE | GIS BENEFIT | $ 5.00 | $ - | TRUE | GIS | TRUE | FALSE | FALSE |
| 15 | TRUE | GIS SW & INTEGRATION | $ - | $ 80.00 | FALSE | GIS | TRUE | FALSE | FALSE |
| 16 | TRUE | GIS ANNUAL SUPPORT | $ - | $ 1.00 | TRUE | GIS | TRUE | FALSE | FALSE |
| 17 | TRUE | IVR BENEFIT | $ 2.00 | $ - | TRUE | IVR | TRUE | FALSE | FALSE |
| 18 | TRUE | IVR SW & INTEGRATION | $ - | $ 1.00 | FALSE | IVR | TRUE | FALSE | FALSE |
| 19 | TRUE | IVR ANNUAL SUPPORT | $ - | $ 1.00 | TRUE | IVR | TRUE | FALSE | FALSE |
| 20 | TRUE | OMS BENEFIT | $ 5.00 | $ - | TRUE | OMS | TRUE | FALSE | FALSE |
| 21 | TRUE | OMS SW & INTEGRATION | $ - | $ 30.00 | FALSE | OMS | TRUE | FALSE | FALSE |
| 22 | TRUE | OMS ANNUAL SUPPORT | $ - | $ 20.00 | TRUE | OMS | TRUE | FALSE | FALSE |
| 23 | TRUE | PREPAY BENEFIT | $ 3.00 | $ - | TRUE | PREPAY | TRUE | FALSE | FALSE |
| 24 | TRUE | PREPAY SW & INTEGRATION | $ - | $ 6.00 | FALSE | PREPAY | TRUE | FALSE | FALSE |
| 25 | TRUE | PREPAY ANNUAL SUPPORT | $ - | $ 0.08 | TRUE | PREPAY | TRUE | FALSE | FALSE |
| 26 | FALSE | WATER BENEFIT | $ 5.00 | $ - | TRUE | AMI | FALSE | FALSE | FALSE |
| 27 | FALSE | GAS BENEFIT | $ 5.00 | $ - | TRUE | AMI | FALSE | FALSE | FALSE |
| 28 | TRUE | TECHNOLOGY UPGRADE 1 | $ - | $ 50.00 | FALSE | SYSTEM | TRUE | FALSE | FALSE |
| 29 | TRUE | TECHNOLOGY UPGRADE 2 | $ - | $ 10.00 | FALSE | SYSTEM | TRUE | FALSE | FALSE |
| 30 | FALSE | TECHNOLOGY UPGRADE 3 | $ - | $ 50.00 | FALSE | SYSTEM | TRUE | FALSE | FALSE |

FIG. 3

GRID IQ SAAS COST/BENEFIT INPUT SHEET

| BENEFIT | INCLUDED? | DESCRIPTION | BENEFIT | ROLLOUT | COST | RECURRING | CATEGORY | E | W | G |
|---|---|---|---|---|---|---|---|---|---|---|
| 1 | TRUE | METER READING COST REDUCTION-ELECTRIC | $ 3.00 | 1 | $ — | TRUE | AMI | TRUE | FALSE | FALSE |
| 2 | FALSE | METER READING COST REDUCTION-WATER | $ 2.00 | 1 | $ — | TRUE | AMI | FALSE | FALSE | FALSE |
| 3 | FALSE | METER READING COST REDUCTION-GAS | $ 3.00 | 1 | $ — | TRUE | AMI | FALSE | FALSE | FALSE |
| 4 | FALSE | WATER METER COMMS | $ — | 1 | $ 100.00 | FALSE | AMI | FALSE | FALSE | FALSE |
| 5 | FALSE | GAS METER COMMS | $ — | 1 | $ 100.00 | FALSE | AMI | FALSE | FALSE | FALSE |
| 6 | FALSE | AMI ANNUAL SUPPORT | $ — | 1 | $ 2.63 | TRUE | AMI | TRUE | FALSE | FALSE |
| 7 | FALSE | ELECTRIC METER REPLACEMENT COST | $ — | 1 | $ 500.00 | FALSE | AMI | FALSE | FALSE | FALSE |
| 8 | FALSE | WATER METER REPLACEMENT COST | $ — | 1 | $ 350.00 | FALSE | AMI | FALSE | FALSE | FALSE |
| 9 | FALSE | GAS METER REPLACEMENT COST | $ — | 1 | $ 300.00 | FALSE | AMI | FALSE | FALSE | FALSE |
| 10 | FALSE | AMI SW & INTEGRATION | $ — | 1 | $ 10.00 | FALSE | AMI | TRUE | FALSE | FALSE |
| 11 | FALSE | CIS BENEFIT | $ 5.00 | 6 | $ — | TRUE | CIS | TRUE | FALSE | FALSE |
| 12 | FALSE | CIS SW & INTEGRATION | $ — | 6 | $ — | FALSE | CIS | TRUE | FALSE | FALSE |
| 13 | FALSE | CIS ANNUAL SUPPORT | $ — | 6 | $ — | TRUE | CIS | TRUE | FALSE | FALSE |
| 14 | TRUE | GIS BENEFIT | $ 5.00 | 6 | $ — | TRUE | GIS | TRUE | FALSE | FALSE |
| 15 | FALSE | GIS SW & INTEGRATION | $ — | 6 | $ 80.00 | FALSE | GIS | TRUE | FALSE | FALSE |
| 16 | FALSE | GIS ANNUAL SUPPORT | $ — | 6 | $ 1.00 | TRUE | GIS | TRUE | FALSE | FALSE |
| 17 | TRUE | IVR BENEFIT | $ 2.00 | 1 | $ 1.00 | TRUE | IVR | TRUE | FALSE | FALSE |
| 18 | FALSE | IVR SW & INTEGRATION | $ — | 12 | $ 1.00 | FALSE | IVR | TRUE | FALSE | FALSE |
| 19 | FALSE | IVR ANNUAL SUPPORT | $ — | 12 | $ 1.00 | TRUE | IVR | TRUE | FALSE | FALSE |
| 20 | TRUE | OMS BENEFIT | $ 5.00 | 6 | $ — | TRUE | OMS | TRUE | FALSE | FALSE |
| 21 | FALSE | OMS SW & INTEGRATION | $ — | 6 | $ 30.00 | FALSE | OMS | TRUE | FALSE | FALSE |
| 22 | FALSE | OMS ANNUAL SUPPORT | $ — | 6 | $ 20.00 | TRUE | OMS | TRUE | FALSE | FALSE |
| 23 | TRUE | PREPAY BENEFIT | $ 3.00 | 6 | $ — | TRUE | PREPAY | TRUE | FALSE | FALSE |
| 24 | FALSE | PREPAY SW & INTEGRATION | $ — | 6 | $ 6.00 | FALSE | PREPAY | TRUE | FALSE | FALSE |
| 25 | FALSE | PREPAY ANNUAL SUPPORT | $ — | 6 | $ 0.08 | TRUE | PREPAY | TRUE | FALSE | FALSE |
| 26 | FALSE | WATER BENEFIT | $ 5.00 | 1 | $ — | TRUE | AMI | FALSE | FALSE | FALSE |
| 27 | FALSE | GAS BENEFIT | $ 5.00 | 1 | $ — | TRUE | AMI | FALSE | FALSE | FALSE |
| 28 | FALSE | TECHNOLOGY UPGRADE 1 | $ — | 36 | $ 50.00 | FALSE | SYSTEM | TRUE | FALSE | FALSE |
| 29 | FALSE | TECHNOLOGY UPGRADE 2 | $ — | 72 | $ 10.00 | FALSE | SYSTEM | TRUE | FALSE | FALSE |
| 30 | FALSE | TECHNOLOGY UPGRADE 3 | $ — | 108 | $ 50.00 | FALSE | SYSTEM | TRUE | FALSE | FALSE |

FIG. 4

| | A | B | C | D | E | F | G | H |
|---|---|---|---|---|---|---|---|---|
| 1 | TECHNOLOGY INVESTMENT COSTS | | | | | | | |
| 2 | | 15000 TOTAL END POINTS | | | | | | |
| 3 | MARKET PRICING FOR APPS | | INTEGRATION FACTOR | INTEGRATION COST W / INTEGRATION | PER METER | ANNUAL SUPPORT | ANNUAL SUPPORT RATE | TOTAL PER METER INVESTMENT | TOTAL INVESTMENT |
| 4 | AMI/NO METERS $ | 4,125,000 | 1.5 | $ 6,817,500 | $ 412.50 | $ 5.16 | 15% | $ 417.66 | $ 6,264,843.75 |
| 5 | CIS $ | | 3.5 | $ — | $ — | $ — | 15% | $ — | $ — |
| 6 | GIS $ | 200,000 | 4.0 | $ 800,000 | $ 53.33 | $ 0.67 | 15% | $ 54.00 | $ 8,100,000.00 |
| 7 | OMS $ | 75,000 | 2.0 | $ 150,000 | $ 10.00 | $ 0.13 | 15% | $ 10.13 | $ 151,875.00 |
| 8 | IVR $ | 50,000 | 1.5 | $ 75,000 | $ 5.00 | $ 0.06 | 15% | $ 5.06 | $ 75,937.50 |
| 9 | PREPAY $ | 15,000 | 2.0 | $ 30,000 | $ 2.00 | $ 0.03 | 15% | $ 2.03 | $ 30,375.00 |
| 10 | OPEN $ | | 0.0 | | | | 0% | | |
| 11 | | | | | | | | | |
| 12 | | TECHNOLOGY COST | | TOTAL COST / INTEGRATION | | | | | |
| 13 | TOTALS | $ 4,465,000 | | $ 7,242,500 | | | | | |
| 14 | | | | | | | | | |
| 15 | TECHNOLOGY REFRESH | $ 2,009,250 | | $ 6,027,750 OVER 10 YRS | | TECHNOLOGY TCO $13,270,250 | | | |
| 16 | | | | | | PER METER | 7.37 | | |
| 17 | ASSUMPTION IS A % OF THE INITIAL INVESTMENT REFRESHED EVERY 36 MONTHS | 45% | | $ 133.95 PER METER PER OCCURRENCE | | | | | |
| 18 | PERCENTAGE | | ANNUAL COST | ANNUAL COUNT | TOTAL | | $ 8.41 TOTAL COST OF OWNERSHIP PER METER / M | | |
| 19 | TECHNOLOGY SUPPORT LABOR | | $75,000 | 2.5 | $ 187,500 | | $ 126,210.42 TCO PER MONTH | | |
| 20 | | | | | | PER METER MONTH | | | |
| 21 | AVOIDED TECHNOLOGY SUPPORT STAFF OF CONSULTANT | | | | | $ 1.04 | A COST IN CAPEX, BENEFIT IN SGAAS | | |

Figure 8:
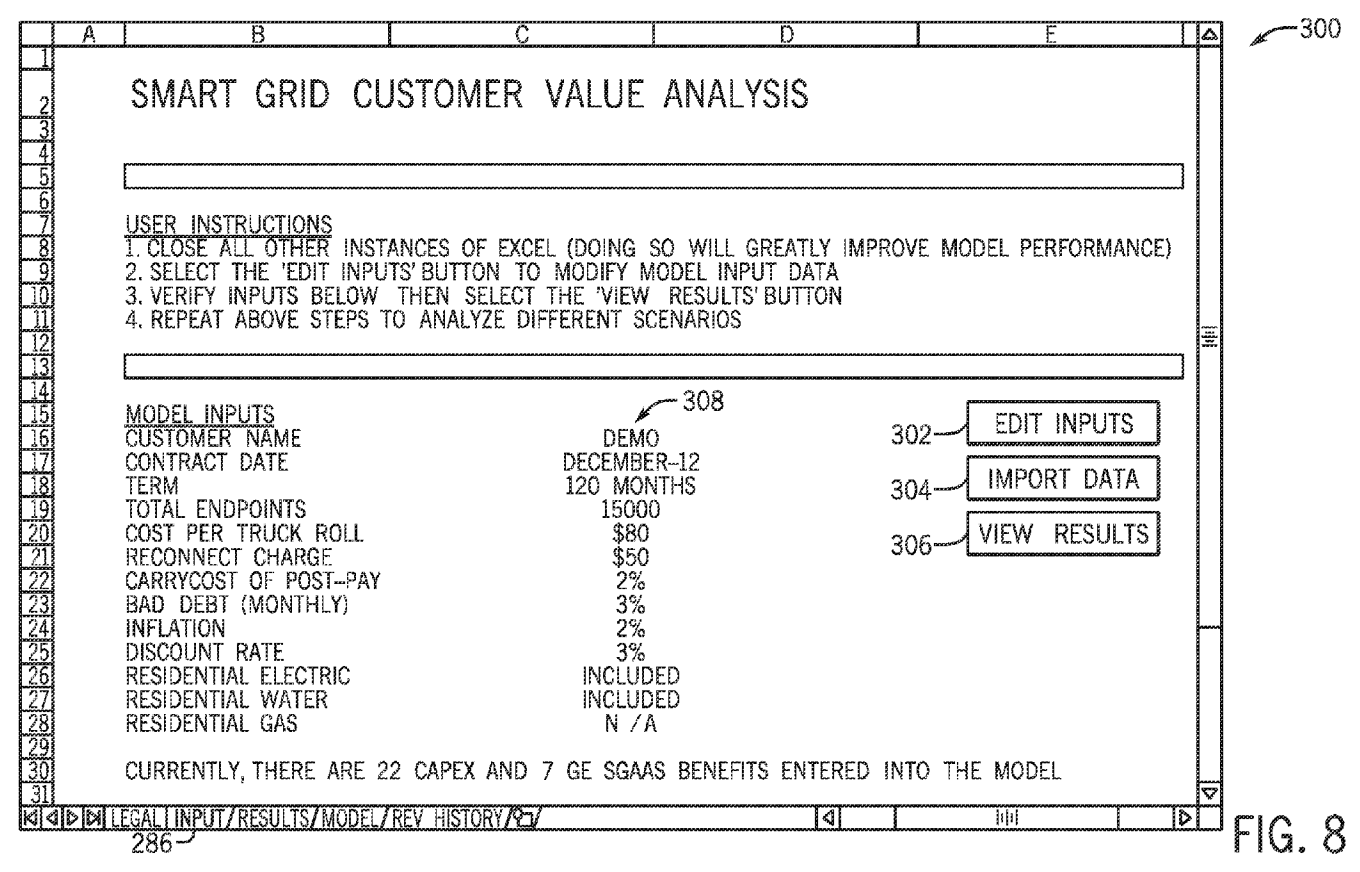

SMART GRID CUSTOMER VALUE ANALYSIS

USER INSTRUCTIONS
1. CLOSE ALL OTHER INSTANCES OF EXCEL (DOING SO WILL GREATLY IMPROVE MODEL PERFORMANCE)
2. SELECT THE 'EDIT INPUTS' BUTTON TO MODIFY MODEL INPUT DATA
3. VERIFY INPUTS BELOW THEN SELECT THE 'VIEW RESULTS' BUTTON
4. REPEAT ABOVE STEPS TO ANALYZE DIFFERENT SCENARIOS

| MODEL INPUTS | |
|---|---|
| CUSTOMER NAME | DEMO |
| CONTRACT DATE | DECEMBER-12 |
| TERM | 120 MONTHS |
| TOTAL ENDPOINTS | 15000 |
| COST PER TRUCK ROLL | $80 |
| RECONNECT CHARGE | $50 |
| CARRYCOST OF POST-PAY | 2% |
| BAD DEBT (MONTHLY) | 3% |
| INFLATION | 2% |
| DISCOUNT RATE | 3% |
| RESIDENTIAL ELECTRIC | INCLUDED |
| RESIDENTIAL WATER | INCLUDED |
| RESIDENTIAL GAS | N/A |

302 — EDIT INPUTS
304 — IMPORT DATA
306 — VIEW RESULTS

CURRENTLY, THERE ARE 22 CAPEX AND 7 GE SGAAS BENEFITS ENTERED INTO THE MODEL

LEGAL INPUT/RESULTS/MODEL/REV HISTORY

Inputs (342):

| | |
|---|---|
| GRID IQ SAAS PRICE | $9.50 |
| ESCALATION | 1.25% |
| CUSTOMER NAME | DEMO |
| CONTRACT DATE | DECEMBER – 12 |
| TERM | 120 MONTHS |
| TOTAL ENDPOINTS | 15000 |
| COST PER TRUCK ROLL | $80 |
| RECONNECT CHARGE | $50 |
| CARRYCOST OF POST-PAY | 2% |
| BAD DEBT (MONTHLY) | 3% |
| INFLATION | 2% |
| DISCOUNT RATE | 3% |
| RESIDENTIAL ELECTRIC | INCLUDED |
| RESIDENTIAL WATER | INCLUDED |
| RESIDENTIAL GAS | N/A |

($1MM USD)

| | |
|---|---|
| UTILITY NET REV TERM (AS-IS) — 360 | $42.65 |
| UTILITY NET REV TERM (CAPEX) — 362 | $11.32 |
| UTILITY NET REV TERM (SGAAS) — 364 | $28.80 |
| NCD (AS-IS) — 366 | $31.33 |
| NCD (CAPEX) — 368 | $13.85 |
| NCD (SGAAS) — 370 | ($17.48) |

NET UTILITY REVENUE 328 ($1MM USD) — 335

| YEAR | (AS-IS) 330 | CAPEX 332 | GRIDIQ 334 | ΔCAPEX 336 | ΔGRIDIQ 338 |
|---|---|---|---|---|---|
| 2012 | $0.31 | ($8.99) | $0.21 | ($9.31) | ($0.11) |
| 2013 | $3.90 | ($1.27) | $2.61 | ($5.17) | ($1.29) |
| 2014 | $3.98 | $2.55 | $2.67 | ($1.43) | ($1.31) |
| 2015 | $4.06 | $0.55 | $2.73 | ($3.51) | ($1.33) |
| 2016 | $4.14 | $2.72 | $2.79 | ($1.42) | ($1.35) |
| 2017 | $4.22 | $2.80 | $2.85 | ($1.42) | ($1.37) |
| 2018 | $4.31 | $2.98 | $2.91 | ($1.33) | ($1.40) |
| 2019 | $4.40 | $3.06 | $2.98 | ($1.42) | ($1.42) |
| 2020 | $4.48 | $3.16 | $3.04 | ($1.42) | ($1.44) |
| 2021 | $4.58 | $2.97 | $3.11 | ($1.42) | ($1.47) |
| 2022 | $4.27 | $11.32 | $2.91 | ($1.30) | ($1.37) |
| TOTAL | $42.65 | | $28.80 | ($31.33) | ($13.85) | — 340

CUMULATIVE UTILITY REVENUE 344 ($1MM USD)

| YEAR | (AS-IS) 346 | CAPEX 348 | GRIDIQ 350 | ΔCAPEX 354 | ΔGRIDIQ 356 |
|---|---|---|---|---|---|
| 2012 | $0.31 | -$8.99 | $0.21 | ($9.31) | ($0.11) |
| 2013 | $4.21 | -$10.27 | $2.82 | ($14.48) | ($1.39) |
| 2014 | $8.19 | -$7.72 | $5.49 | ($15.91) | ($2.70) |
| 2015 | $12.25 | -$7.17 | $8.22 | ($19.42) | ($4.03) |
| 2016 | $16.39 | -$4.45 | $11.01 | ($20.84) | ($5.38) |
| 2017 | $20.61 | -$1.64 | $13.36 | ($22.26) | ($6.76) |
| 2018 | $24.92 | -$0.84 | $16.77 | ($25.76) | ($8.15) |
| 2019 | $29.32 | $2.13 | $19.74 | ($27.18) | ($9.57) |
| 2020 | $33.60 | $5.20 | $22.78 | ($28.60) | ($11.02) |
| 2021 | $38.38 | $8.35 | $25.89 | ($30.02) | ($12.48) |
| TOTAL | $38.38 | $8.35 | $25.89 | ($30.02) | ($12.48) | — 358

LEGAL / INPUT / RESULTS / MODEL / REV HISTORY — 288

ECONOMIC ANALYSIS OF GRID INFRASTRUCTURE

BACKGROUND

The invention relates generally to infrastructure, and more particularly to a method and system for analyzing infrastructure.

Infrastructure, such as a smart grid, includes a variety of systems and components. In the smart grid example, systems may include power generation systems, power transmission systems, advanced metering systems, digital communications systems, control systems, and their related components. Other items associated with the infrastructure may include contracts, service level agreements, and like, detailing capitalization, cost, and revenues for the infrastructure. Designing and analyzing such infrastructure can be complex and costly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system for analyzing infrastructure is provided. The system includes a grid intelligence quotient as a service (GIQAAS) system. The GIQAAS system includes an infrastructure data gathering system having a first input form configured to collect an economic data related to an infrastructure. The GIQAAS system further includes an economic modeling system configured to import the economic data and to derive an economic analysis based on the economic data. The GIQAAS system is configured to provide the infrastructure data gathering system to a first user for collection of the economic data, and to provide the economic modeling system to a second user for derivation of the economic analysis.

In a second embodiment, non-transitory machine readable media is provided. The non-transitory machine readable media includes instructions configured to collect an economic data related to a smart grid infrastructure and instructions configured to import the economic data. The non-transitory machine readable media further includes instructions configured to derive an economic analysis based on the economic data. The non-transitory machine readable media also includes instructions configured to present the economic analysis to a user. The economic analysis includes an economic comparison between a first suite of smart grid infrastructure offerings and a second suite of smart grid infrastructure offerings.

In a third embodiment, a method is provided. The method includes calculating a monthly cost by using an inflation forecast model configured to derive an inflation and an infrastructure operating cost model configured to derive a smart grid infrastructure operating cost. The method also includes calculating a as-is net monthly revenue by using the monthly cost, a monthly revenue model configured to derive an operating monthly revenue, a customer defaults model configured to derive a customer default cost, and a finance charges model configured to derive a financing cost. The method further includes calculating a first net monthly revenue by using first inputs related to a first suite of smart grid infrastructure offerings. The method additionally includes calculating a second net monthly revenue by using second inputs related to a second suite of smart grid infrastructure offerings, and presenting the as-is, first, and second monthly revenues for comparison.

DRAWINGS

These and other features, aspects, and advantages of the present invention will become better understood when the following detailed description is read with reference to the accompanying drawings in which like characters represent like parts throughout the drawings, wherein:

FIG. 2 is a screen view of an embodiment of an infrastructure data gathering system of the GIQAAS system of FIG. 1;

FIG. 3 is a screen view of an embodiment of an input form for a first suite of infrastructure offerings included in the infrastructure data gathering system of FIG. 2;

FIG. 4 is a screen view of an embodiment of an input form for a second suite of infrastructure offerings included in the infrastructure data gathering system of FIG. 2;

FIG. 5 is a screen view of an embodiment of a worksheet form included in the infrastructure data gathering system of FIG. 2;

FIG. 6 is another screen view of an embodiment of the worksheet form included in the infrastructure data gathering system of FIG. 2;

FIG. 8 is another screen view of an embodiment of the economic modeling system of the FIG. 7;

FIG. 10 is a screen view of an embodiment of a results form included in the economic modeling system of FIG. 7;

DETAILED DESCRIPTION

Figure 1:
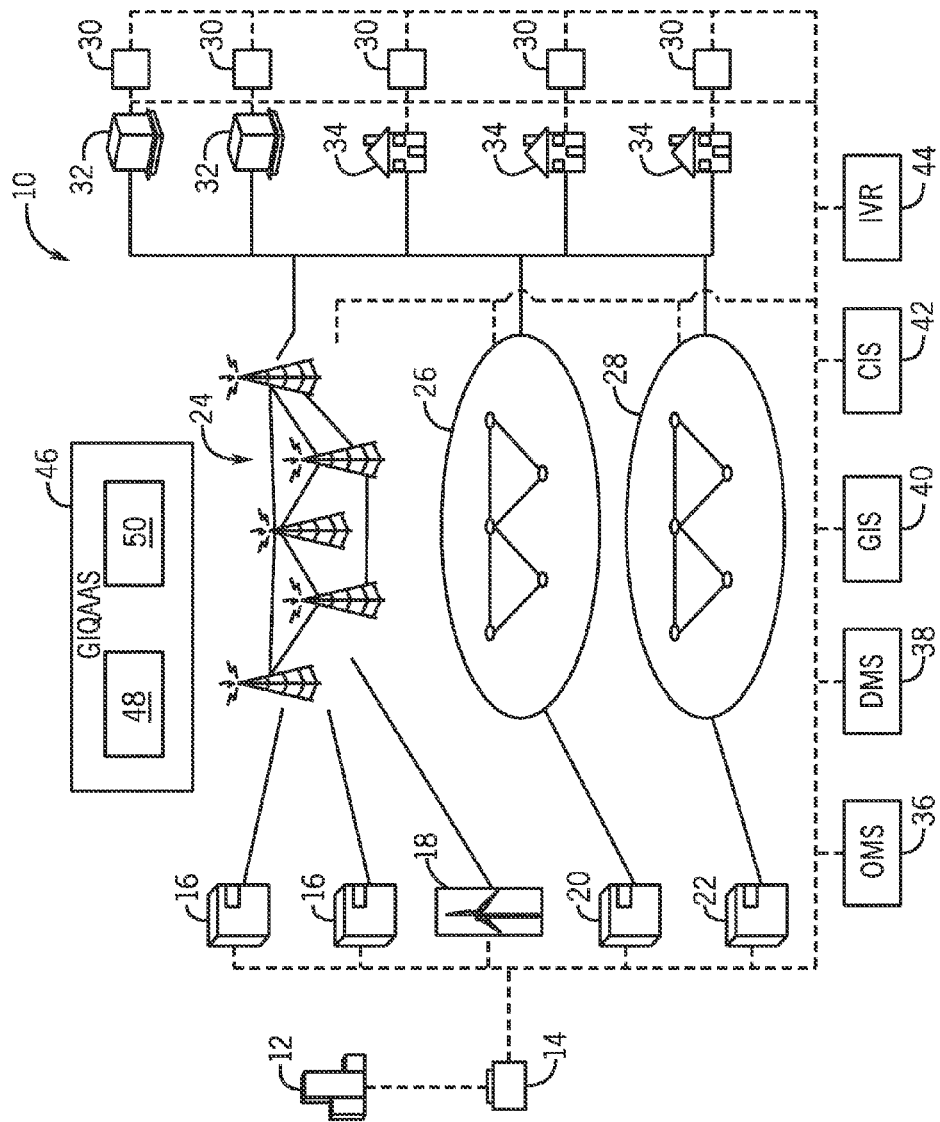
FIG. 1 is a block diagram of an embodiment of an infrastructure (e.g., a smart grid infrastructure) and a grid intelligence quotient as a service (GIQAAS) system.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Certain infrastructure, such as an electric smart grid, may include a variety of interconnected systems and components. For example, the smart grid may include power generation systems, power transmission and distribution systems, metering systems, digital communications systems, control systems, and their related components. Other items associated with the smart grid may include contracts, service level agreements, and like, detailing costs (e.g., capitalization costs, operating costs), and revenues for the smart grid. The embodiments described herein enable an infrastructure designer to compare and contrast various combinations of components from one or more manufacturers to determine a component package that minimizes cost, maximizes a return on investment (ROI), and performs desired functions. In certain embodiments, a Grid Intelligence Quotient as a Service (GIQAAS) system is provided that enables a more efficient selection and analysis of various smart grid components. The GIQAAS may include non-transitory machine readable media storing code or computer instructions that may be used by a computing device to implement the techniques disclosed herein. The GIQAAS may include an infrastructure data gathering system that enables the collection of data related to a variety of smart grid technology offerings, including cost and benefit data. The offerings may include hardware, software, and/or service offerings from one or more manufacturers or service providers. In one embodiment, a first suite of infrastructure offerings from the one or more manufacturers or service providers may be compared to a second suite of infrastructure offerings from a single manufacturer or service provider, such as one or more smart grid packages available from General Electric Co., of Schenectady, N.Y. The comparison may include a detailed analysis of purchasing or leasing the first suite of offerings as compared to purchasing or leasing the second suite of offerings. For example, a value analysis may be performed, comparing costs, benefits, and a return on investment (ROI) of the first and the second suite of infrastructure offerings.

In certain embodiments the GIQAAS may use a model, such as an economic model, to analyze the one or more suite of offerings. In one embodiment, the model may be separate from the infrastructure data gathering system included in the GIQAAS system. For example, the economic modeling system may include the economic model. The infrastructure data gathering system may be provided to a first user or customer (e.g., a purchaser or lessee of smart grid infrastructure, such as a water, gas, or electric utility), and may enable the collection of infrastructure data, including a type of infrastructure (e.g., technology category or class), usage for the infrastructure, capital expenditure data, financing data (e.g., interest rates, payment options, revenue collections, inflation), and the like, as described in more detail below. The economic modeling system may then be used to analyze the data gathered. For example, the economic modeling system may be provided to a second user, such as a seller or lessor of smart grid infrastructure. The separation between the modeling activities and the data collection activities minimizes or eliminates any erroneous manipulation of the model by the data gathering team. Indeed, the infrastructure data gathering system may be emailed to an end user having little or no knowledge of modeling techniques, or may be provided through the internet via web pages or websites. The model may then use the data collected by the infrastructure data gathering system to derive the detailed analysis and comparison between the first and the second suite of offerings. By providing for an analysis between various hardware, software, and/or service configurations, an infrastructure designer may design infrastructure that meets desired properties while improving the costs and revenues associated with the infrastructure. In this way, a seller of infrastructure may provide a buyer of infrastructure for a comprehensive economic analysis, including cost comparisons between the seller's offerings and/or competitor's offerings.

With the foregoing in mind, it may be useful to describe an embodiment of an infrastructure, such as an example smart grid system 10 illustrated in FIG. 1. It is to be noted that the systems and methods described herein may apply to other infrastructure, including but not limited to cloud computing infrastructure, airport infrastructure, transit infrastructure, and telecommunications infrastructure. As depicted, the smart grid system 10 may include one or more utilities 12. The utility 12 may provide for oversight operations of the smart grid system 10. For example, utility control centers 14 may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water processing plant 20 and gas processing plant 22. For example, water processing plants 20 may provide for potable water, and gas processing plants 22 may provide for natural gas.

The power generated by the power generation stations 16 and 18 may be distributed through a power transmission grid 24. Likewise, the water and gas provided by the plants 20 and 22 may be delivered through a water distribution grid 26 and a gas distribution grid 28. The grids 24, 26, and 28 may cover a broad geographic region or regions, such as one or more municipalities, states, or countries. In the depicted embodiment, an advanced metering infrastructure (AMI) 30 may be used to measure, collect, and analyze electricity, water, and/or gas usage. The AMI 30 may be communicatively coupled to one or more of the components of the smart grid 10, including the grids 24, 26, 28. Additionally, the AMI 30 may enable two-way communication between commercial sites 32, residences 34 and the utility control center 14, providing for a link between consumer behavior and utility consumption (e.g., electric, water, and/or gas consumption). For example, AMI meters 30 may track and account for pre-paid electricity, water and/or gas in a similar fashion to pre-paid cell phone usage. Likewise, the utility's consumers 32 and 34 may benefit from lower utility charges by optimizing their utility use, for example, to take advantage of lower rates during low demand hours. Washer/dryers, electric car chargers, and other flexible power consumption appliances may be programmed to operate during low demand hours, resulting in lower utility bills and a more balanced utilization of energy.

An outage management system (OMS) 36 may predict and respond to outage events, for example, by using an outage prediction engine. The OMS 30 may interact with a distribution management system (DMS) 38 suitable for re-routing power, water, and/or gas from plants 16, 18, 20, and 22 experiencing lesser demand and away from plants 16, 18, 20, and 22 experiencing greater demand. A geographic information system (GIS) 40 may also be used to provide for physical location information of the plants 16, 18, 20, and 22, grid 24 components (e.g., electrical cabling, transformers, distribution towers), grid 26 components (e.g., water pipes, valves, pressure reducers), grid 28 components (e.g., storage tanks, gas pipes, valves), the AMI 30, the commercial sites 32 and the residential sites 34. The physical location information may be used, for example, by the OMS 36 and the DMS 38 in predicting and resolving outage issues. Additionally, the GIS 40 may be used to visualize the various locations on a map or other suitable visual medium (e.g., globe, chart). Likewise, a customer information system (CIS) 42 may be used to provide customer information (e.g., sites 32 and 34), including billing information, electric usage information, water usage information, gas usage information, billing rates, and the like. Additionally, an interactive voice response (IVR) system 44 may provide automated voice recognition and menu navigation suitable for processing customer requests over telephonic lines.

The smart grid system 10 enables the utility 12 to improve capacity, improve energy distribution and usage, and to dynamically manage loads more effectively. However, the smart grid system 10 may include components, such as but not limited to components of the control center 14, components of the plants 16, 18, 20, and 22, components of the grid 24, components of the grid 26, components of the grid 28, the AMI 30, the OMS 36, the DMS 38, the GIS 40, the CIS 42, and/or the IVR 44 that may be provided by multiple manufacturers. It would be beneficial for the utility 12 to compare and contrast the aforementioned components of the smart grid system 10 to derive a value analysis useful in determining costs, benefits, and/or ROI based on income received from the customer base (e.g., commercial sites 32 and residences 34) and costs associated with capitalization or leasing of the aforementioned smart grid system 10 components. By deriving an economic analysis, a more optimal suite of components and services may be used in the smart grid 10. Advantageously, the embodiments describe herein, such as a GIQAAS system 46 having an infrastructure data gathering tool 48 and an economic modeling tool 50, may be used to provide for an economic analysis of the smart grid system 10 component, as described in more detail below.

FIG. 2 is a screen view 52 of an embodiment of an input form or tab 54 of the infrastructure data gathering tool 48 included in the GIQAAS system 46. The data gathering tool 48 may be provided, for example, to the utility 12 for use in collecting information related to the technologies (e.g., components of the control center 14, components of the plants 16, 18, 20, and 22, components of the grid 24, components of the grid 26, components of the grid 28, the AMI 30, the OMS 36, the DMS 38, the GIS 40, the CIS 42, and/or the IVR 44) that may be used during implementation or rollout of the smart grid system 10, as well as the costs and benefits of using such technologies. In the depicted embodiment, the data gathering tool 48 is implemented by using a computer-based spreadsheet. In other embodiments, the data gathering tool 48 may be implemented as a web-based system or in any form executable by a computing device (e.g., laptop, workstation, table, cell phone), such as a software system or program provided in a computer-readable medium (e.g., DVD, flashdrive).

The tab 54 enables the gathering of smart grid 10 customer value analysis data. For example, the tab 54 may be used to collect data generally related to the value or profit garnered from customers 32 and 34 of the utility 12, as depicted in the screen view 52. The collected data may include rows 56, which include a customer name 58, a contract start date 60, a contract term 62, a cost per truck roll 64 (e.g., cost to deploy a service vehicle), a reconnect charge (e.g., cost to reconnect a customer that has been previously disconnected) 66, a carry cost of post-pay 68 (e.g., percent of total cost to carry for customers that post pay bills), a bad debt 70 (e.g., percent of customers that do not pay the monthly bill), an inflation 72 (e.g., average national or local inflation rate), a discount rate 74 (e.g., average interest rate), a residential electric 76 flag (e.g., a true of false value based on if the analysis to be performed will include electric meters), a residential water flag 78 (e.g., a true of false value based on if the analysis to be performed will include water meters), and a residential gas flag 80 (e.g., a true of false value based on if the analysis to be performed will include gas meters).

Rows 82 generally collect data related to the value or profit garnered from electric customers 32, 34. Accordingly, the rows 82 include an endpoints (electric) 84, where an endpoint represents a residential site 32 or a customer site 34. The rows 82 also include an average customer monthly bill amount (electric) 86, a cost per bill (electric) 88 (e.g., a cost of generating each customer bill), a monthly disconnect rate (electric) 90 (e.g., percent of customers that disconnect each month), a high risk percent (electric) 92 (e.g., customers having a higher risk of defaulting on payment), and a percent loss (electric) 94 (e.g., percent of electricity that is lost before arriving at the endpoint).

Likewise, rows 96 generally collect data related to the value or profit garnered from customers purchasing water. Accordingly, the rows include an endpoints (water) 98, an average customer monthly bill (water) 100, a cost per bill (water) 102, a monthly disconnect rate (water) 104, a high risk percent (water) 106, and a percent loss (water) 108. For customers purchasing gas (e.g., natural gas), rows 110 may be used. Thus, the rows 110 include an endpoints (gas) 112, an average customer monthly bill (gas) 114, a cost per bill (gas) 116, a monthly disconnect rate (gas) 118, a high risk percent (gas) 120, and a percent loss (gas) 122. As depicted, each row includes a column 124 labeled "Description" that described the items in the rows 56, 82, 96, and 110. Likewise, a column 126 labeled "Customer" is used to collect data related to the rows 56, 82, 96, and 110. A column 128 labeled "Comments" is also provided as a help or guidance column that includes a description for each row illustrated. By capturing detailed customer data in the tab 54, the GIQAAS system 46 enables an improved analysis of revenue and cost streams, including customer 32, 34 revenue and cost streams. The data gathering tool 48 may then collect capital expenditure information using, for example, a tab 130, as described below in more detail with respect to FIG. 3.

FIG. 3 is a screen view 132 of an embodiment of the tab or input form 130 labeled "CapEx" of the infrastructure data gathering tool 48. In the depicted embodiment, the tab 130 may be used to collect data related to a first suite of hardware, software, and/or service offerings from the one or more manufacturers or service providers. Indeed, smart grid 10 components and services from multiple manufacturers may be aggregated as a first suite of infrastructure offerings 134, depicted as rows in the screen view 132. In the illustrated example, there are approximately 35 individual offerings or rows 134 grouped into the first suite of offerings 134. It is to be understood that, in other examples, fewer or greater number offerings (e.g., rows) may be included. A user, such as a utility 12, may enter capitalization expenditure data for the suite of offerings 134. The capitalization expenditure data may include cost and benefit (e.g., revenue) data as depicted in the screen view 132. The collected data may then be analyzed, for example, to compare the suite of offerings 134 to another suite of offerings, such as a second suite of infrastructure offerings described in more detail with respect to FIG. 4. By comparing two or more suite of infrastructure offerings, the GIQAAS 46 may enable a more efficient smart grid system 10 having a higher ROI and lower costs.

A column 136 labeled "Benefit" may be used to uniquely identify each offering (e.g., row) of the first suite 134 by providing, for example, a unique identifier (ID) for each row. A column 138 labeled "Included" may be used to denote whether an individual offering (e.g., row) is used as part of the analysis. That is, the user may toggle individual offerings on by placing a "True" as the cell value or off by placing a "False" as the cell value. A column 140 labeled "Description" may be used to provide the description of each individual offering. A column 142 labeled "Benefit" may be used to enter any economic benefit or revenue associated with the offering. A column 144 labeled "Rollout" may be used to input a desired month (e.g., 1 through 12) when the offering would be provided or "rolled out" to the customers 32 and/or 34.

A column 146 labeled "Cost" may be used to input an economic cost associated with the offering, if any. A column 148 labeled "Recurring" may contain the value "True" if the cost is a recurring or ongoing cost, and the value "False" if the cost is a one-time cost. A column 150 labeled "Category" may be used to describe a technology category for the offering. As illustrated, AMI 30, OMS 36, GIS 40, CIS 42, and IVR 44 technology categories are shown in column 150. Other technology categories may include components of the control center 14, components of the plants 16, 18, 20, and 22, components of the grid 24, components of the grid 26, and/or components of the grid 28 shown in FIG. 1. "Prepay" technology categories are also provided as input, which relate to the pre-payment of utility bills, as described above. Likewise, "System" technology categories are additionally provided in column 150, related to the smart grid 10 system as a whole. Columns 152, 154, and 156 labeled "E", "W", and "G", respectively, may be used to denote if the offering is related to electricity (E), water (W), and/or Gas (G).

By providing the user with the screen view 132 that enables the data input of offerings from any one or more manufacturers or service providers, the first suite of offerings 134 may be compared to a second suite of offerings, for example, a second suite of offerings provided by a manufacturer, such as General Electric Co., of Schenectady, N.Y. It is to be understood that, while in the contemplated embodiment the second suite of offerings is provided by a single manufacturer, in other embodiments the second suite of offerings may be provided by one or more manufacturers or service providers. In one embodiment, the second suite of offerings may be provided in an input form or tab, such as the tab as depicted in FIG. 4.

FIG. 4 is a screen view 158 of an embodiment of a tab or input form 160 labeled "SGaaS" of the infrastructure data gathering tool 48. In the depicted embodiment, the tab 160 may be used to collect data related to a second suite of offerings 162 (e.g., Smart Grid as a Service [SGaaS] offerings), including hardware, software, and/or service offerings from a single manufacturer. Although the presently contemplated embodiment of the tab 160 includes the second suite of offerings 162 from the single manufacturer or service provider, other embodiments may include additional tabs having other suites of offerings, including suites of offerings from a combination of manufacturers or service providers.

As in FIG. 3, the suite of offerings 162 includes a multitude of rows (e.g., offerings) capturing information related to various technology categories (e.g., components of the control center 14, components of the plants 16, 18, 20, and 22, components of the grid 24, components of the grid 26, components of the grid 28, the AMI 30, the OMS 36, the DMS 38, the GIS 40, the CIS 42, and/or the IVR 44). For a more efficient comparison between the first suite of offerings 134 shown in FIG. 3 and the second suite of offerings 162 shown in FIG. 4, the screen view 158 includes columns 164, 166, 168, 170, 172, 174, 176, 178, 180, 182, and 184, which contain the same type of information (e.g., ID, included as a package, description, benefit, rollout month, cost, recurring cost, category, E, W, and G) as described above with respect to FIG. 3. Accordingly, the user may switch between tabs 130 and 160 to compare and contrast between the first suite of offerings 134 and the second suite of offerings 162. Indeed, the tabs 130 and 160 contain the same category or type of information in a similar arrangement, so that an offering-by-offering comparison between two suites of offerings 134 and 162 may be more easily performed and visualized. Additionally, a worksheet tab 186 may be provided, as described in more detail below with respect to FIG. 5, that may enable a more efficient analysis of smart grid system 10 components, including comparison between the two or more suites of offerings 134 and 162.

FIG. 5 is a screen view 188 of an embodiment of the worksheet form or tab 186 labeled "Worksheet" enabling the economic analysis of the smart grid system 10 and/or comparison between the first suite of offerings 134 shown in FIG. 3 and the second suite of offerings 162 shown in FIG. 4. The screen view 188 includes linking features that "link" or otherwise enable the retrieval and use of data from the tabs 54, 130, and 160. For example, the linking features may include the linking of cells from any of the data found in the tabs 54, 130, and 160. The screen view 188 may thus process data from the tabs 54, 130, and 160 and present the data in a format suitable for more efficiently visualizing costs and benefits of the smart grid system 10. For example, the screen view 188 includes a market pricing for certain applications column 190 based on retrieving the number of electric, water, and gas endpoints 84, 98, and 112 from tab 54 shown in FIG. 2. An integration factor may be entered by the user into column 192. The integration factor may be related to the integration of installation of smart grid system 10 components (e.g., components of the control center 14, components of the plants 16, 18, 20, and 22, components of the grid 24, components of the grid 26, components of the grid 28, the AMI 30, the OMS 36, the DMS 38, the GIS 40, the CIS 42, and/or the IVR 44). The market pricing column 190 may be multiplied by the integration factor column 192 to arrive at a cost with integration column 194.

A cost per meter column 196 may be used derive the meter costs with integration for each endpoint or meter. For example, the cost with integration column 192 may be divided by a total number of endpoints 198 to compute the cost per meter column 196. A annual support rate or percentage 200 column may then capture a support percentage provided to customers of each type of technology category (e.g., components of the control center 14, components of the plants 16, 18, 20, and 22, components of the grid 24, components of the grid 26, components of the grid 28, the AMI 30, the OMS 36, the DMS 38, the GIS 40, the CIS 42, and/or the IVR 44). Based on the annual support rate percentage column 200, an annual support per meter per month column 202 may be calculated. More specifically the annual support per meter per month column 202 may be calculated by multiplying the cost with integration column 194 with the annual support rate percentage 200 column, and then dividing by 12 months, and again dividing by the total number of endpoints 198. Additionally, the cost per meter column 196 may be added to the annual support per meter per month column 202 to derive a total per meter investment column 204. The total per meter investment column 204 may then be multiplied by the number of endpoints 198 to arrive at a total investment column 206. By providing for the collection of data and the derivation of columns 194, 196, 202, 204, and 206, the screen view 188 may enable a more efficient analysis and display of cost and revenue data for the smart grid system 10.

Additionally, a total technology cost 208 may be computed based on the sum of the market pricing for certain applications column 190. Likewise, a total cost with integration 210 may be derived based on the sum of the cost with integration column 210. A cost of refreshing current technology 212 with the smart grid system 10 components may also be derived. For example, a percent refreshment rate 214 may be applied to the total technology cost 208 to compute the cost of refreshing current technology 212. The cost of refreshing current technology 212 may then be used to compute a technology refreshment cost 216 spread over a certain time period (e.g., 1 year, 2 years, 3 years, 5 years, 10 years). A technology total cost of ownership (TCO) 218 may also be computed as a sum of the technology refreshment cost 216 and the total cost with integration 194. The TCO cost 218 may then be divided by the total number of endpoints 198 to arrive at a TCO per meter cost 220. Likewise, a technology refreshment cost per meter occurrence 222 may be derived by dividing the technology refreshment cost 212 with the total number of endpoints 198.

An annual cost of technology support labor 224 may be provided, useful in collecting the labor cost associated with customer support related to the first suite of offerings 134. In one embodiment, in the second suite of offerings 162, this may be a benefit, since the labor costs may be included as one of the rows of the second suite of offerings 162. A personnel count 226 may be multiplied to the labor cost 224 to derive a total labor cost 228. A cost of labor avoided per month per meter 230, for example, avoided by using the second suite of offerings 162, may then be derived by dividing the total labor cost 228 by 12 months, and then dividing again by the total number of endpoints 198. A TCO per meter per month 232 may then by calculated by adding the per meter cost 220 to the cost of labor avoided per month per meter 230. Multiplying the TCO per meter per month 232 by the total number of endpoints 198 may then compute a TCO per month 234. By deriving the revenues and costs described with respect to FIG. 5, a comprehensive economic analysis may be provided.

Figure 6:
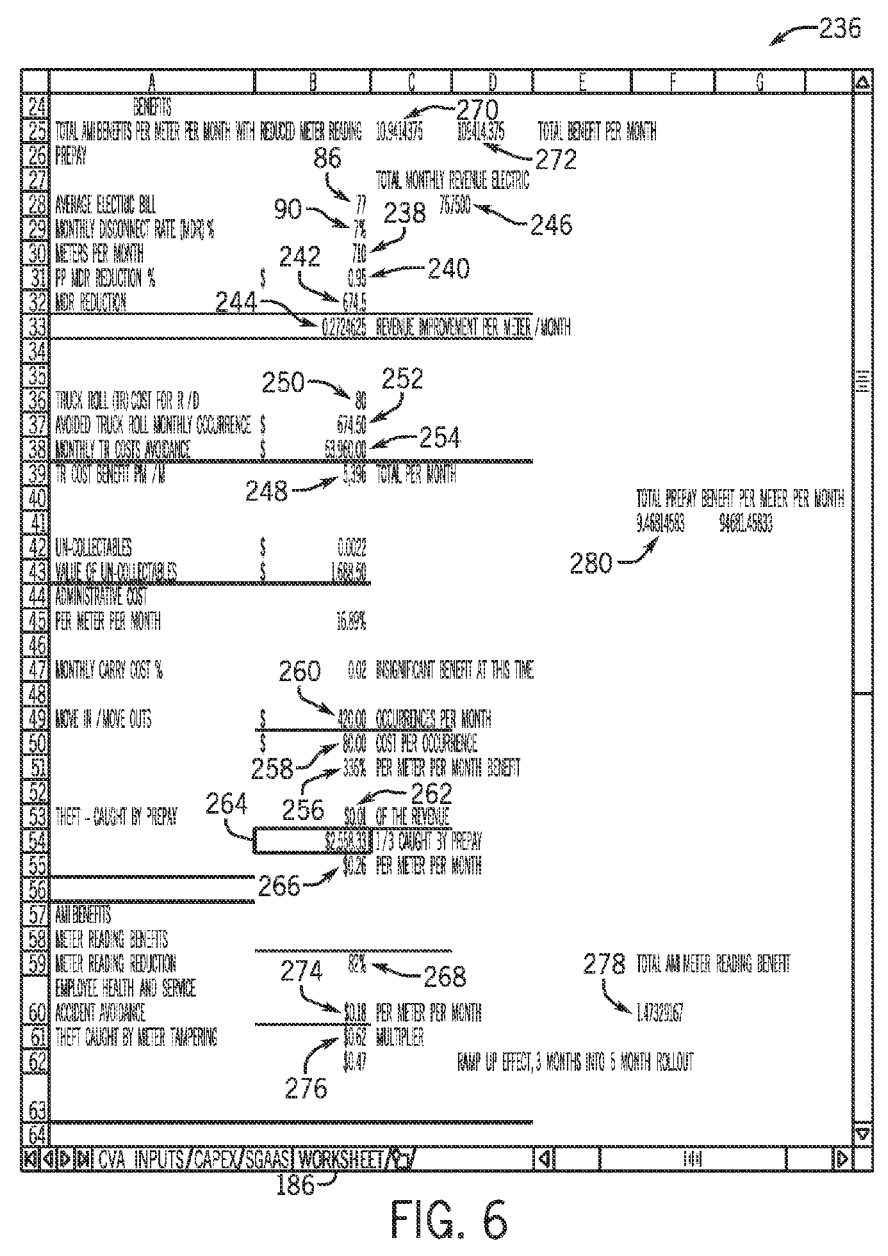

FIG. 6 is a screen view 236 of an embodiment the worksheet form or tab 186 enabling a derivation of various benefits associated with the first and the second suite of offerings 134 and 162 shown in FIGS. 3 and 4, respectively. In the depicted example, the average electric bill 86 shown in FIG. 2 may be displayed by the screen view 236, along with the monthly disconnect rate (MDR) 90. A total number of meters disconnected per month 238 may then be derived, for example, by multiplying the monthly disconnect rate 90 with the total number of electric endpoints 84 shown in FIG. 2. A prepay MDR reduction percent 240 may then be collected from the user. Accordingly, a MDR reduction 242 based on the MDR reduction percent 90 may be derived, for example, by multiplying the total number of meters disconnected per month 238 with the prepay MDR reduction percent 240. A revenue improvement or benefit per meter per month 244 may then be calculated by subtracting the MDR reduction 242 from the total number of meters disconnected per month 238, multiplying by the average electric bill 86, and dividing by the total number of electric endpoints 84. Likewise, a total monthly revenue for electric service 246 may be computed, by multiplying the average electric bill 86 with the total number of electric endpoints 84. Similar benefits may be computed for gas endpoints and water endpoints.

Other benefits, such as avoidance of truck rolls per meter per month 248 may be calculated. Truck rolls may be avoided, for example, because prepayment of utility services may lower the MDR. The truck roll (TR) cost 250 may be multiplied by an avoided TR monthly occurrence 252 to arrive at a monthly TR costs avoidance 254. The avoidance of truck rolls per meter per month 248 may then be calculated by dividing the monthly TR costs avoidance 254 by the total number of electric endpoints 84. Other benefits may also be calculated, such as a percent prevention of move in/move outs per month benefit 256. The percent prevention of move in/move outs per month 256 may be calculated by multiplying a cost per occurrence 258 with a number of move in/move outs prevented 260, and then dividing by the total number of electric endpoints 84. Benefits may also include theft prevention benefits. For example, prepayment of electricity would reduce or eliminate a theft caught by prepay loss 262 incurred by the theft of electricity. A loss prevention benefit 264 assuming ⅓ of the loss 262 is prevented by prepaying may then be calculated by multiplying the theft caught by prepay loss 262 with the total monthly electric service revenue 246, and then dividing by 3. The divisor (e.g., 3) may be chosen based on a theft rate prevented by prepayment, and may be other rates (e.g., 1, 2, 4, 5). Higher prevention rates may lead to lower divisors, and vice versa. A per meter theft prevention benefit 266 may then be derived by dividing the loss prevention benefit 264 with the total number of electric endpoints 84.

Economic benefits from the use of technologies such as the components of the plants 16, 18, 20 and 22, grid 24 components, grid 26 components, grid 28 components, AMI 30, the OMS 36, the DMS 38, the GIS 40, the CIS 42, and/or the IVR 44 may also be estimated by the user. For example, the user may enter an estimated technology benefit percentage 268 for a technology category (e.g., components of the control center 14, components of the plants 16, 18, 20, and 22, components of the grid 24, components of the grid 26, components of the grid 28, the AMI 30, the OMS 36, the DMS 38, the GIS 40, the CIS 42, and/or the IVR 44). This estimate 268 may be used for deriving other calculations, including a total AMI meter reading benefit 270, which may be multiplied by the total number of electric endpoints 84 to arrive at a total AMI benefit per month 272. Other benefits include an employee health and service accident avoidance benefit 274 and a theft caught by meter tampering benefit 276. A total AMI meter reading benefit 278 may also be provided, suitable for deriving the total benefit of using AMI meter readings.

Benefits may also be grouped. For example, a total prepay benefit per meter per month 280 may be additively grouped by adding the benefits 248, 266, and 244, among others. By providing for both costs as well as benefits associated with implementing the smart grid system 10, the screen view 236 enables an in-depth economic analysis of the impact of implementation of the smart grid system 10. Additionally, the economic modeling tool 50 may be provided, to further enable an economic analysis of the smart grid system 10 components, as described in more detail with respect to FIG. 7 below.

Figure 7:
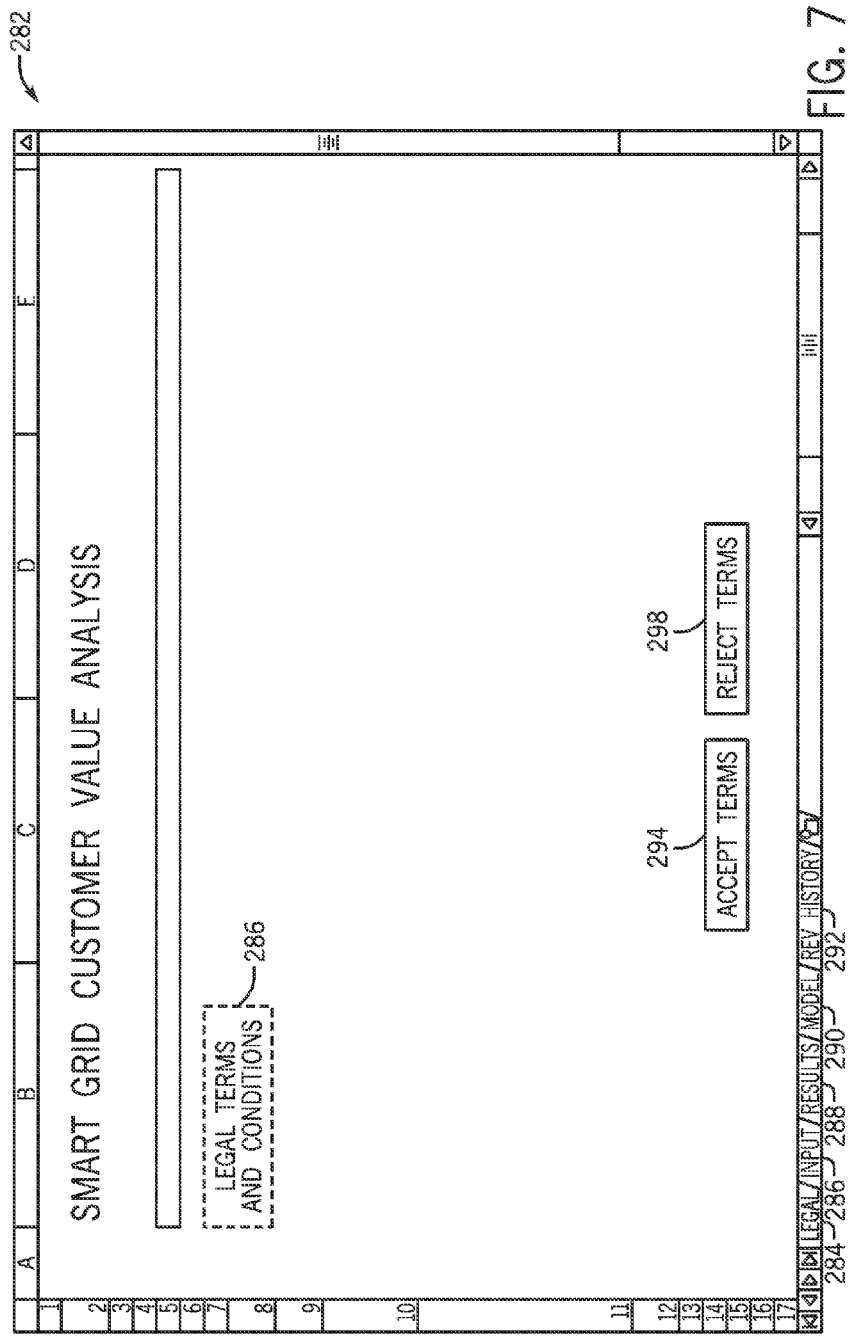
FIG. 7 is a screen view of an embodiment of an economic modeling system of the GIQAAS system of FIG. 1.

FIG. 7 is a screen view 282 depicting an embodiment of the economic modeling tool 50 of the GIQAAS system 46. In the depicted embodiment, the economic modeling tool 50 is implemented by using a computer-executable spreadsheet. In other embodiments, the economic modeling tool 50 may be implemented as a web-based system or in any other form executable by a computing device (e.g., laptop, workstation, table, cell phone). The economic modeling tool 50 may include a legal tab 284, an input tab 286, a results tab 288, a model tab 290, and revision history tab 292. In the depicted legal tab 284, a button 294 may be provided to contractually bind the user to usage terms 296 of using the economic modeling tool 50. By actuating the button 294, the user contractually agrees to the usage terms 296. Otherwise, the user may actuate a button 298 and exit the economic modeling tool 50. In one embodiment, actuating the button 294 may then activate the input tab 286, as depicted in FIG. 8. The model tab 290 may include a computer executable economic model, as described in more detail below with respect to FIG. 13. The revision history tab 292 may include a log of programming revisions or version histories of the economic modeling tool 50.

FIG. 8 is a screen view 300 on an embodiment of the input tab 286 of the economic modeling tool 50. In the depicted embodiment, an edit inputs button 302, an import data button 304, and a view results button 306 are provided. In one embodiment, activating the import data button 304 enables the loading of data gathered by using the data gathering tool 48 described above with respect to FIGS. 2-6. In one example, all of the data gathered by the data gathering tool 48 may be imported into the economic modeling tool 50. In another example, a subset of the data from the data gathering tool 48, such as data from tabs 54, 130, 160, and/or 186 shown in FIGS. 2-6, may be imported into the economic modeling tool 50. The data may then be displayed onto a column 308 of the screen view 300. By separating the data gathering activities from the modeling activities, the GIQAAS system 46 reduces or eliminates any erroneous manipulation of the economic model shown in FIG. 13 by the data gathering team. Actuating the edit inputs button 302 may then activate a data editing dialog box as described in more detail below with respect to FIG. 9.

Figure 9:
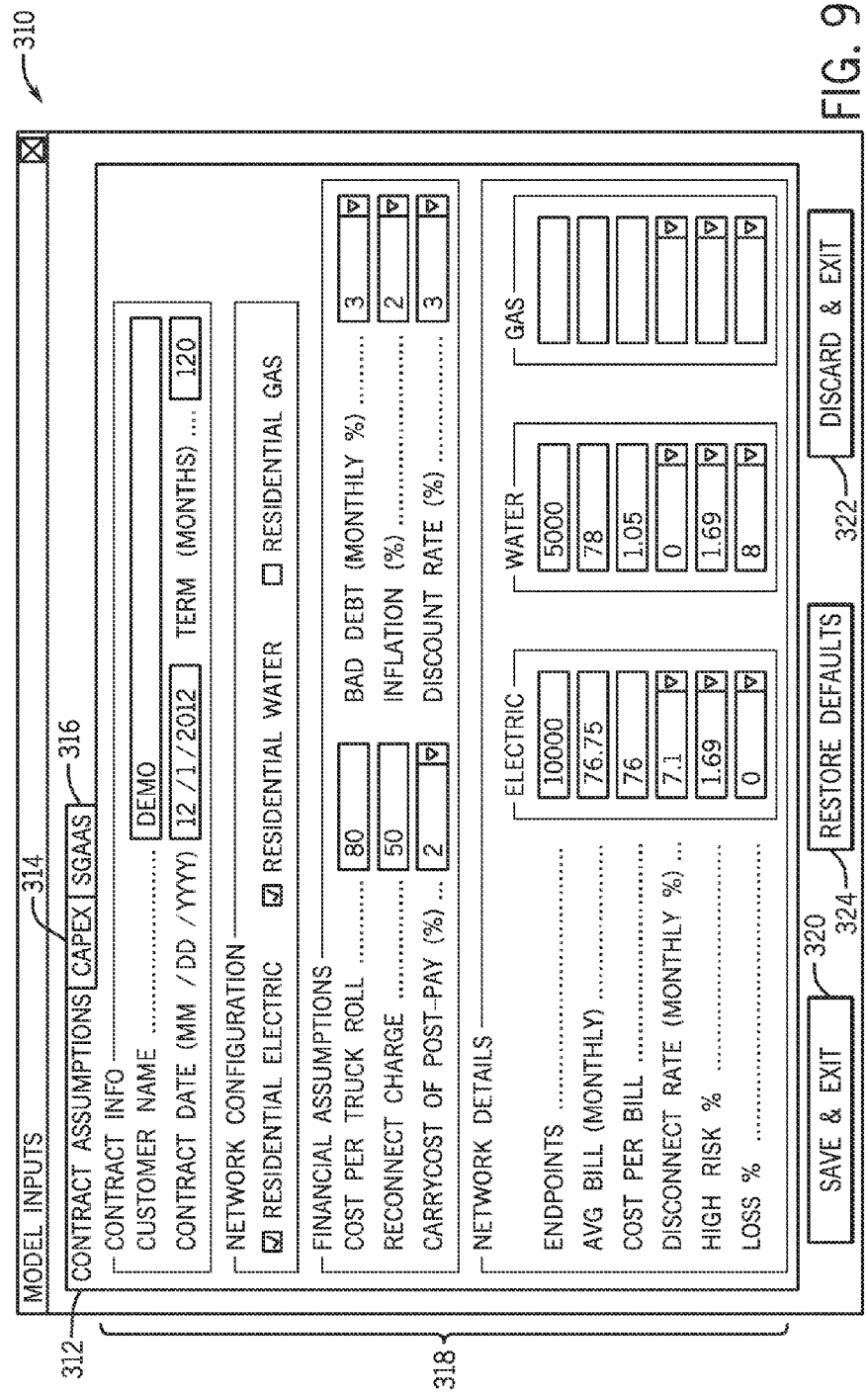
FIG. 9 is illustrative of an embodiment of a dialog box included in the economic modeling system of FIG. 7.

FIG. 9 depicts an embodiment of a dialog box 310 that may be activated by actuating the button 302 shown in FIG. 8. The dialog box 310 may enable the entry and/or editing of data, including all the data imported into the economic modeling tool 50. For example, a contract assumptions tab 312 may be used to select and edit data imported from the tab 54 and screen view 52 shown in FIG. 2. Likewise, a cap expenditures (capex) tab 314 may be used to select and edit data imported from the tab 130 and screen view 132 (e.g., data related to the first suite of offerings 134) shown in FIG. 3. Additionally, a smart grid as a service (SGaas) tab 316 may be used to select and edit data imported from the tab 160 and screen view 158 (e.g., data related to the second suite of offerings 162) shown in FIG. 4. By enabling the entry and/or editing of data, including imported data, the dialog box 310 may enable a more efficient data editing. For example, rather than editing the data in the data gathering tool 48, and then re-importing the edited data, the user may activate the dialog box 310 and edit the data directly in a data editing section 318. After the data has been edited, a save & exit button 320 may be used to save the data and return to the screen view 300 shown in FIG. 8. If data editing is to be cancelled, a discard & exit button 322 may be used to return to the screen view 300 without saving the edited data. A restore defaults button 324 is also provided, which may automatically enter default values for all the data in the data editing section 318.

FIG. 10 is a screen view 326 of an embodiment of the results form or tab 288 of the economic modeling tool 50. As mentioned above, the results tab 288 may be activated by actuating the view results button 306 of the screen view 300 shown in FIG. 8. In the depicted embodiment, the results derived by using an economic model, such as the economic model shown in FIG. 13, may be derived and presented. For example, a net utility revenue table 328 may be derived and presented, suitable for comparing net revenue streams (e.g., profit minus costs). In the illustrated screen view 326, a first net revenue column 330 is depicted side-by-side with a second net revenue column 332 and a third net revenue column 334. A timeline column 335 is also provided, depicting yearly data. In one embodiment, the first net revenue column 330 is representative of revenue for the utility 12 with no new capital costs. That is, the first net revenue column 330 does not include costs associated with acquiring infrastructure, such as smart grid system 10 components. The second net revenue column 332 includes revenue minus costs based on acquiring the first suite of offerings 134 described above with respect to FIG. 3. Likewise, the third net revenue column 334 includes revenue minus costs based on acquiring the second suite of offerings 162 described above with respect to FIG. 4. As mentioned above, each of the net revenue columns 330, 332, and 334 may be derived by using the economic model described in more detail below with respect to FIG. 13. By presenting the columns 330, 332, and 334 side-by-side, a more efficient comparison of the economic impact of the suites 134 and 162 may be provided.

The screen view 326 also includes a first cost column 336 and a second cost column 338. In one embodiment, the first cost column 326 corresponds to capitalization costs incurred by purchasing or leasing the first suite of offerings 134. Likewise, the second cost column 338 corresponds to capitalization costs incurred by purchasing or leasing the second suite of offerings 162. In the depicted embodiment, the data in columns 330, 332, 334, 336, and 338 is shown as yearly data. However, in other embodiments, daily, weekly, monthly, and/or quarterly data may be shown. A total for each column 330, 332, 334, 336, and 338 may be provided by row 340. By deriving and displaying columns 330, 332, 334, 336, and 338, and their total values 340, the economic modeling tool 50 of the GIQAAS system 46 may more efficiently enable a comparison of revenue, including yearly net revenue, of purchasing the first or the second suite of offerings 134, 162. Indeed, the user may easily visualize any differences between procuring the first and the second suite of offerings 134 and 162. Additionally, the screen view 326 may present a summary of certain data in a screen section 342, for example, data imported by using the data gathering tool 48. The summary of the data shown in screen section 342 may provide for an overview of certain values used throughout the economic calculations.

The depicted screen view 326 also provides a cumulative (e.g., gross) set of revenue calculations. For example, a cumulative utility revenue table 344 may be derived and presented, suitable for comparing cumulative revenue streams. In the illustrated embodiment, a first cumulative revenue column 346 is depicted side-by-side with a second cumulative revenue column 348 and a third cumulative revenue column 350. Each of the cumulative columns 346, 348, and 350 include rows that accumulate cost based on previous rows. That is, subsequent rows of the columns 346, 348, and 350 are additively summed from the previous rows, as depicted. A timeline column 352 is also provided, depicting yearly data. In one embodiment, the first cumulative revenue column 346 is representative of the cumulative revenue of the utility 12, with no new capital costs. That is, the first cumulative revenue column 346 does not include costs associated with acquiring infrastructure, such as smart grid system 10 components. The second cumulative revenue column 348 includes cumulative revenue minus costs based on acquiring the first suite of offerings 134 described above with respect to FIG. 3. Likewise, the third cumulative revenue column 350 includes cumulative revenue minus costs based on acquiring the second suite of offerings 162 described above with respect to FIG. 4. Each of the cumulative revenue columns 346, 348, and 350, may be derived by using the economic model of FIG. 13.

The screen view 326 also includes a first cumulative cost column 354 and a second cumulative cost column 356. In one embodiment, the first cumulative cost column 354 corresponds to cumulative capitalization costs incurred by purchasing the first suite of offerings 134. Likewise, the second cumulative cost column 356 corresponds to cumulative capitalization costs incurred by purchasing the second suite of offerings 162. A total for each column 346, 348, 350, 354, and 356 may be provided by row 358. In the depicted embodiment, the data in columns 346, 348, 350, 352, 354, and 356 is shown as yearly data. However, in other embodiments, daily, weekly, monthly, and/or quarterly data may be shown. By deriving and displaying columns 346, 348, 350, 352, 354, and 356, the economic modeling tool 50 of the GIQAAS system 46 may more efficiently enable a comparison of revenue, including yearly cumulative revenue, of purchasing the first and the second suite of offerings 134, 162.

Additionally, the screen view 326 may present a total of net revenue without capitalization costs 360, a total net revenue with capitalization costs 362 based on purchasing the first suite of offerings 134, and a total net revenue with capitalization costs 364 based on purchasing the second suite of offerings 162. Likewise, a first net cumulative differential (NCD) 366 may be derived by subtracting the total net revenue with capitalization costs 362 based on purchasing the first suite of offerings 134 from the total of net revenue without capitalization costs 360. A second NCD 368 may also be derived by subtracting the total net revenue with capitalization costs 364 based on purchasing the second suite of offerings 162 from the total of net revenue without capitalization costs 360. Similarly, a third NCD 370 may be computed by subtracting the total net revenue with capitalization costs 364 based on purchasing the second suite of offerings 162 from the total net revenue with capitalization costs 362 based on purchasing the first suite of offerings 134. In this way, the first, second and third NCDs 366, 368, 370 may be compared. Graphical comparisons of revenues and costs may also be provided, as described in more detail below with respect to FIGS. 11 and 12.

Figure 11:
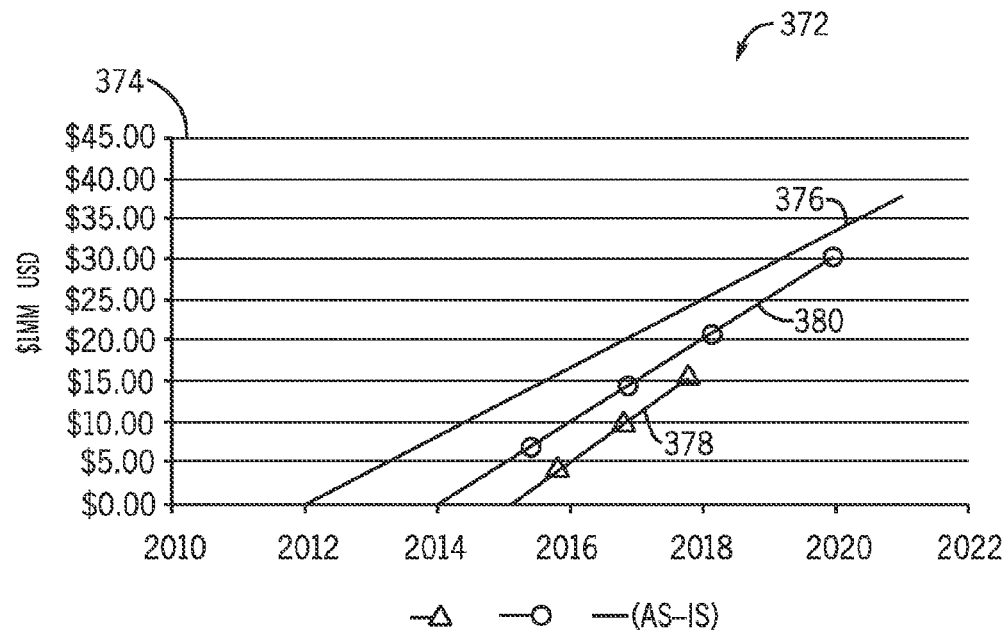
FIG. 11 is illustrative of an embodiment of a line graph included in the economic modeling system of FIG. 7.

FIG. 11 is a screen view 372 of an embodiment of a graph 374 provided by the economic modeling tool 50 of the GIQAAS system 46. The graph 374 provides for a line graph presentation of the columns 346, 348, and 350 shown in FIG. 10. That is, line 376 may be representative of the data in column 346, line 378 may be representative of data in column 348, and line 380 may be representative of data in column 350. By representing the columns 346, 348, and 350 as lines 376, 378, and 380, respectively, the graph 374 may provide for an intuitive visual presentation of the economic differences between the suites 134 and 162. Other types of graphs or visuals may be presented, such as a graph illustrated in FIG. 12.

Figure 12:
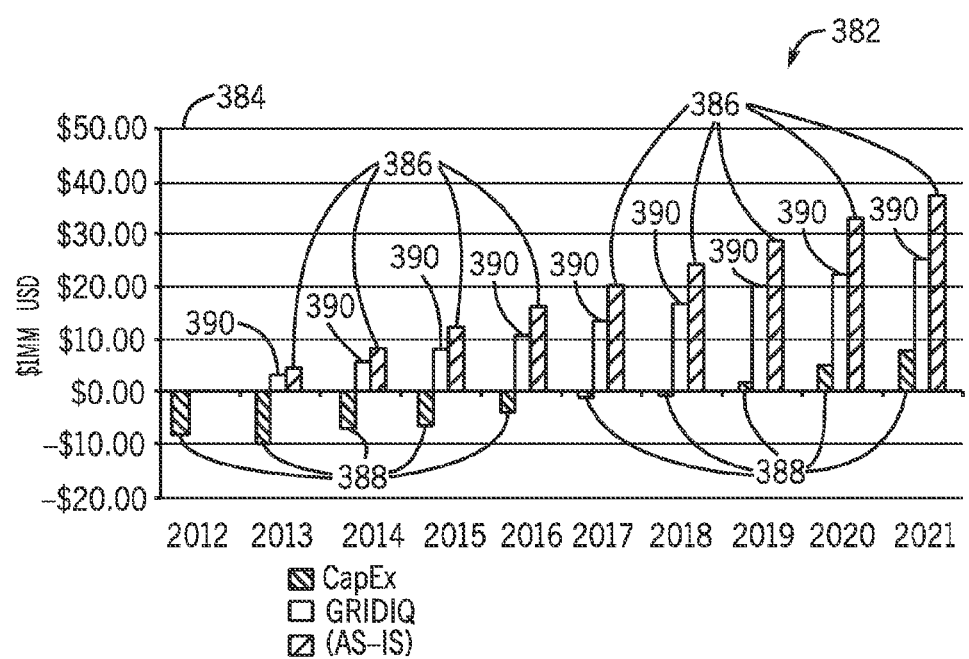
FIG. 12 is illustrative of an embodiment of a bar graph included in the economic modeling system of FIG. 7.

FIG. 12 is illustrative of a screen view 382 of an embodiment of a graph 384 provided by the economic modeling tool 50. In the illustrated embodiment, the graph 384 provides for a bar chart presentation of the data in columns 346, 348, and 350 shown in FIG. 10. For example, bars 386 may be representative of the data in column 346, bars 388 may be representative of data in column 348, and bars 390 may be representative of data in column 350. By representing the columns 346, 348, and 350 as bars 386, 388, and 390, respectively, the graph 384 may provide for an intuitive visual presentation of the economic differences between the suites 134 and 162. Indeed, all or some of the data presented in the screen view 326 of FIG. 10 may be presented in any number of graphs and charts, including line graphs, bar graphs, and pie charts. It is to be noted that, in one embodiment, that all of the screens and charts depicted in FIGS. 2-12 are included in the GIQAAS system 46. Indeed, the GIQAAS system 46 may include all of the elements and associated descriptions related to FIGS. 2-12.

Figure 13:
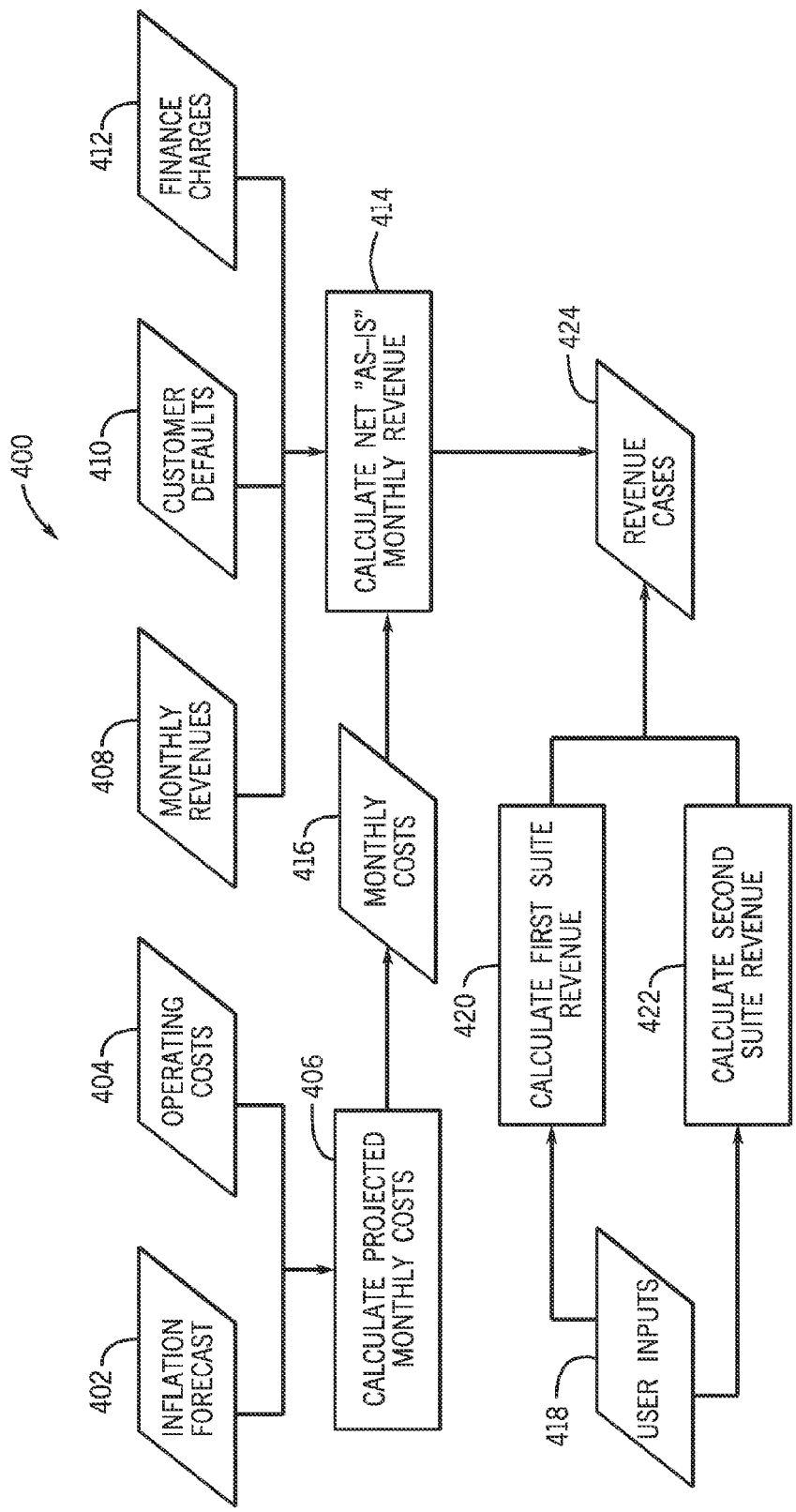
FIG. 13 is block diagram of an embodiment of an economic model included in the economic modeling system of FIG. 7.

As mentioned above, an economic model may be used to derive the calculations depicted in FIGS. 10, 11, and 12. FIG. 13 shows an embodiment of an economic model 400 useful in providing for the aforementioned economic calculations, including costs, revenues, and ROI. The economic model 400 may include instructions or computer code executable by a computing devices such as a desktop, a laptop, a tablet, and a cell phone. In the depicted embodiment, an inflation forecast model 402 may be used to forecast projected inflation. In one example, a Federal Reserve inflation model, such as a rational expectations model of inflation available from the United States Federal Reserve, Washington D.C., may be used for the model 402. The inflation forecast model 402 may be used jointly with an operating costs model 404 to calculate projected monthly costs (block 406). The operating cost model 404 may be derived by using activity based costing (ABC), constructive cost models (COCOMO), operational cost calculators, cost estimation models, cost driver models, engineering cost models, and/or microeconomic cost models. A monthly revenue model 408 may be combined with a customer defaults model 410 and a finance charges model 412 to calculate a net "as-is" monthly revenue (block 414) based on derived monthly costs 416.

For example, the monthly revenues model 408 may forecast monthly revenues based on historical analysis (e.g., statistical analysis) of revenue streams, monetization of services models, and/or bottom-up revenue forecasting. The customer defaults model 410 may use statistical techniques such as linear regression, non-linear regression, data mining, actuarial forecasting, curve forecasting (e.g., Bell curve, Gaussian distribution curves, non-Gaussian distribution curves) to derive a number of customers defaults. The finance charges model 412 may use banking finance rates, utility 12 finance rates, flat interest rates, and progressive interest rates to derive charges related to financing services and operations. The models 408, 410, and 412 may use the monthly costs 416 to calculate the net "as-is" monthly revenue (block 414). In the depicted embodiment, the "as-is" revenue does not include costs associated with the first or the second suites of offerings 134 and 162.

User inputs 418 may be captured, for example, by the data gathering tool 48, and used to calculate a first suite of offerings revenue (block 420). In one embodiment, the models 402, 404, 408, 410, and 412 may be used, as mentioned above, to process the user inputs 418 and calculate the first suite of offerings revenue (block 420) based on the first suite of offerings 134 shown in FIG. 3. Likewise, the models 402, 404, 408, 410, and 412 may be used with the user inputs 418 to calculate a second suite of offerings revenue (block 422) based on the second suite of offerings 162 shown in FIG. 4. The blocks 414, 420, and 422 may derive revenue cases 424, e.g., revenues related to the first suite of offerings 134, the second suite of offerings 162, and "as-is" revenues. The revenue cases 424 may then be presented for comparison and further analysis, as described above with respect to FIGS. 8-12.

Figure 14:
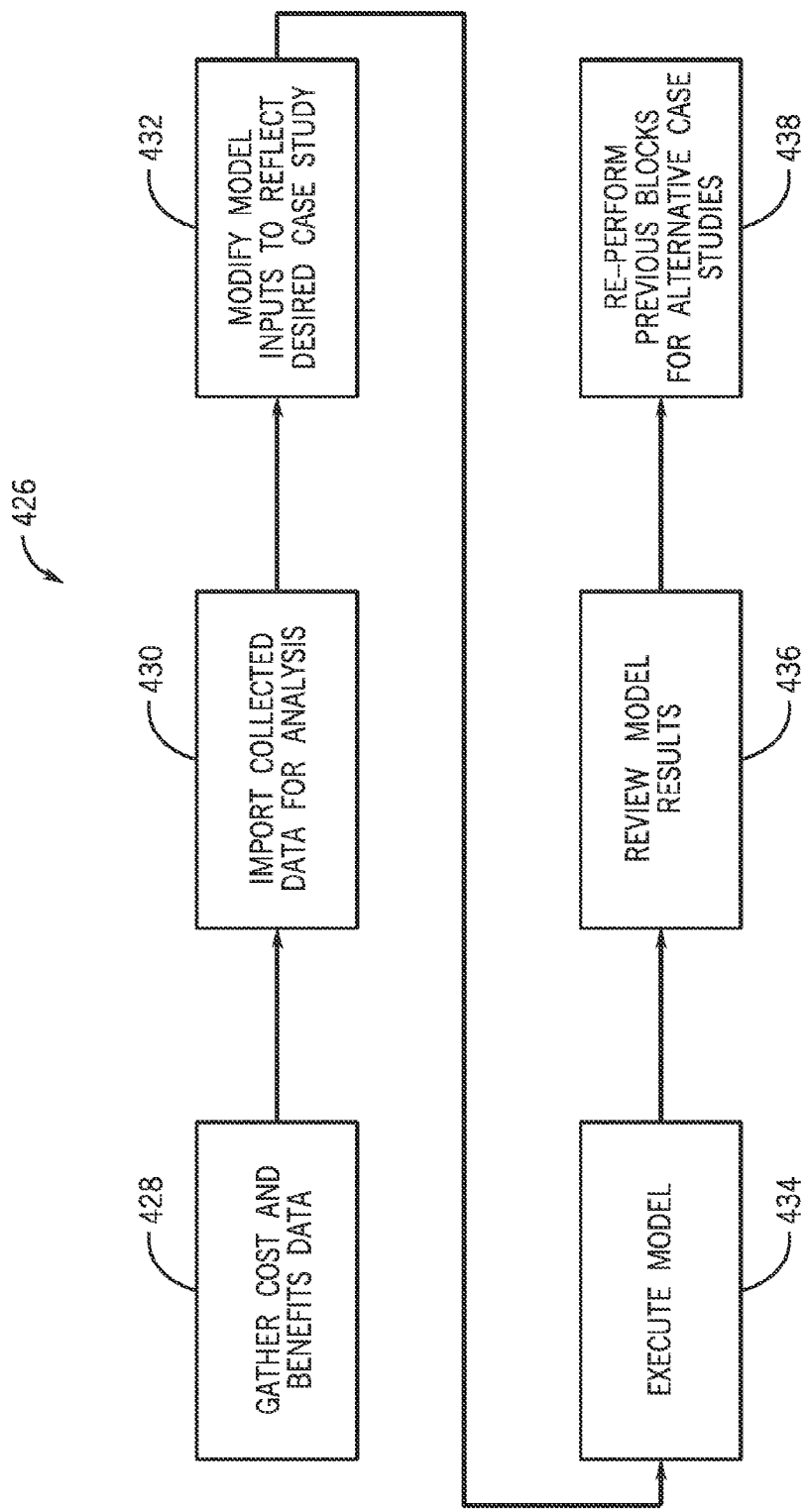
FIG. 14 is flow chart of an embodiment of a process enabling the economic analysis of infrastructure using the GIQAAS system of FIG. 1.

FIG. 14 is illustrative of an embodiment of a process 426 that may use the data gathering tool 48, the economic modeling tool 50, and the economic model 400 to compare the first suite of offerings 134 with the second suite of offerings 162. The process 426 may include instructions or computer code executable by a computing device such as a desktop, a laptop, a tablet, and a cell phone. In the depicted embodiment, the user may use the data gathering tool 48 to collect costs and benefits data (block 428), as described above. The collected data may then be imported (block 430), for example, into the economic modeling tool 50 by using the import data button 304 shown in FIG. 8. The imported data may then be modified by the user to reflect desired case studies (block 432). That is, the user may edit the data as described above with respect to the dialog box 310 described in FIG. 9 to adequately provide for desired inputs (e.g., costs and benefits) related to the first and the second suite of offerings 134, 162. The economic model 400 may then be executed to produce economic results (block 434), as described above with respect to FIG. 13. The user may then review and analyze the model results (block 436). For example, the user may compare and contrast the benefits, costs and ROI associated with the first and second suite of offerings 134 and 162 by using columns and graphs, as described above with respect to FIGS. 10, 11, and 12. If desired, alternate case studies or analysis may be performed (block 438). Data may be gathered again (block 428) and the blocks of the process 400 may be followed to provide for new results. By comparing and contrasting various inputs, the first and the second suite of offerings 134 and 162 may be more thoroughly analyzed to derive a more efficient, cost-effective, profitable smart grid system 10.

Technical effects of the invention include a grid intelligence quotient as a service (GIQAAS) system enabling the collection and analysis of inputs related to infrastructure, such as smart grid infrastructure, to more efficiently design the smart grid infrastructure. An infrastructure data gathering is provided, suitable for use by a user, enabling the collection of infrastructure data. The user may enter, for example, cost and benefits data related to various components and technologies included in a first and a second suite of infrastructure offerings. An economic modeling system having an economic model may then be provided to analyze the first and the second suite of infrastructure offerings. The separation between the economic modeling and the data collection minimizes or eliminates any erroneous manipulation of the economic model by the data gathering team. Indeed, the infrastructure data gathering system may be emailed to an end user having little or no knowledge of economic modeling techniques. By comparing and contrasting the first suite of offerings with the second suite of offerings, the user may efficiently compare costs and benefits related to the suites of offerings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for analyzing infrastructure, comprising:
a processor configured to execute:
a software system configured to:
receive customer information further comprising:
a customer name of the customer;
a contract start date;
a contract term;
a cost to deploy a service vehicle;
a plurality of endpoint types, further comprising at least one of an electric endpoint type, a water endpoint type and a gas endpoint type;
a total number of endpoints by endpoint type;
a monthly disconnect rate by endpoint type;
a prepay monthly disconnect rate reduction for each endpoint type;
an average bill by endpoint type;
a total monthly service revenue by endpoint type;
a truck roll cost;
a cost per occurrence of move ins and move outs;
a plurality of grid components, further comprising at least two of:
an advanced metering infrastructure (AMI), an outage management system (OMS), a distribution management system (DMS), a geographic information system (GIS), a customer information system (CIS), an interactive voice response (IVR) system, a power plant component, a gas processing plant component, a water processing plant component, an electrical distribution grid component, a water distribution grid component, a gas distribution grid component and a utility control center component; and
a first suite of offerings and a second suite of offerings of a plurality of energy offerings from one or more manufacturers or service providers;
compute, by the processor, costs of the customer acquiring the first suite of offerings and to compute the costs of the customer acquiring the second suite of offerings by:
multiplying each of a market pricing of an application of each of the plurality of grid components by an integration factor related to each of their installation to calculate a cost with integration for each of the plurality of grid components;
dividing the cost with integration for each of the plurality of grid components by the total number of endpoints to compute a cost per meter;
multiplying the cost with integration for each of the plurality of the grid components with an annual support rate percentage for each of the grid components, divided by twelve months, and further divided by the total number of endpoints, to compute an annual support per meter per month;
summing the cost per meter by the annual support per meter per month to calculate a total per meter investment;
computing, using the total per meter investment and the total number of endpoints, a total investment for each of the plurality of grid components;
summing each of the market pricing of the application of each of the plurality of grid components to calculate a total technology cost;
summing the cost with integration for each of the plurality of grid components to calculate a total cost with integration;
multiplying a percent refreshment rate to the total technology cost to compute a cost of refreshing current technology;
computing a technology refreshment cost spread over time using the cost of refreshing current technology;
summing the technology refreshment cost spread over time and the total cost with integration to compute a total cost of ownership;

dividing the total cost of ownership by the total number of endpoints and further by the twelve months to compute a total cost of ownership per meter cost;

multiplying a personnel count by a labor cost to compute a total labor cost;

dividing the total labor cost by the twelve months and by the total number of endpoints to compute a cost of labor avoided per month per meter by using the second suite of offerings;

adding the total cost of ownership per meter cost to the cost of labor avoided per month per meter to compute a total cost of ownership per meter per month; and multiplying the total cost of ownership per meter per month by the total number of endpoints to compute a total cost of ownership per month;

compute, by the processor, a revenue generated by the customer acquiring the first suite of offerings and compute the revenue generated by the customer acquiring the second suite of offerings by:

multiplying the monthly disconnect rate by endpoint type with the total number of endpoints by endpoint type to compute a total number of meters by endpoint type disconnected per month;

multiplying the total number of meters by endpoint type disconnected per month with the prepay monthly disconnect rate reduction by endpoint type to compute a monthly disconnect rate reduction;

subtracting the monthly disconnect rate reduction from the total number of meters by endpoint type disconnected per month, and multiplying by the average bill by endpoint type, and dividing by the total number of endpoints by endpoint type to calculate a revenue improvement per meter per month;

multiplying the average bill by endpoint type with the total number of endpoints by endpoint type to compute a total monthly revenue;

multiplying the truck roll cost by an avoided track roll monthly occurrence to compute a monthly track roll costs avoidance;

dividing the monthly track roll costs avoidance by the total number of endpoints by endpoint type to compute an avoidance of truck rolls per meter per month;

multiplying the cost per occurrence of move ins and move outs with a number of move ins and move outs prevented and dividing by the total number of endpoints by endpoint type to compute a percent prevention of move ins and move outs per month;

multiplying a theft caught by prepay loss by endpoint type with the total monthly service revenue by endpoint type and dividing by a theft rate prevented by prepayment value to calculate a loss prevention benefit; and dividing the loss prevention benefit by the total number of endpoints by endpoint type to calculate a per meter theft prevention benefit;

calculate, by the processor, an as-is net revenue that does not include costs of the customer acquiring the first suite of offerings or the customer acquiring the second suite of offerings;

calculate, by the processor, a capital expenditure net revenue by subtracting the costs of the customer acquiring the first suite of offerings from the revenue generated by the customer acquiring the first suite of offerings;

calculate, by the processor, a grid intelligence quotient net revenue by subtracting the costs of the customer acquiring the second suite of offerings from the revenue generated by the customer acquiring the second suite of offerings;

compute, by the processor, an as-is cumulative revenue, a capital expenditure cumulative revenue and a grid intelligence quotient cumulative revenue from each of the as-is net revenue, the capital expenditure net revenue and the grid intelligence quotient net revenue; and display, by the processor, each of the as-is cumulative revenue, the capital expenditure cumulative revenue and the grid intelligence quotient cumulative revenue as a textual representation, a graphical representation, or a combination thereof, of cumulative revenue against time for analyzing economic differences of the customer implementing the first plurality of offerings, the customer implementing the second plurality of offerings or the customer not implementing any of the first plurality of offerings or the second plurality of offerings.

2. The system of claim 1, wherein the infrastructure comprises a smart grid system infrastructure.

3. The system of claim 2, wherein the smart grid system infrastructure comprises only two of: the advanced metering infrastructure (AMI), the outage management system (OMS), the distribution management system (DMS), the geographic information system (GIS), the customer information system (CIS), the interactive voice response (IVR) system, the power plant component, the gas processing plant component, the water processing plant component, the electrical distribution grid component, the water distribution grid component, the gas distribution grid component, or the utility control center component.

4. The system of claim 1, wherein the software system comprises a website.

5. The system of claim 1, wherein the software system comprises a spreadsheet.

6. The system of claim 2, wherein the smart grid system infrastructure is provided by a single manufacturer.

7. The system of claim 2, wherein the smart grid system infrastructure is provided by a plurality of manufacturers.

8. A non-transitory machine readable media storing instructions, comprising:
instructions configured to
receive customer information, the customer information further comprising:
a customer name of the customer;
a contract start date;
a contract term;
a cost to deploy a service vehicle;
a plurality of endpoint types, further comprising at least one of an electric endpoint type, a water endpoint type and a gas endpoint type;
a total number of endpoints by endpoint type;
a monthly disconnect rate by endpoint type;
a prepay monthly disconnect rate reduction for each endpoint type;
an average bill by endpoint type;
a total monthly service revenue by endpoint type;
a truck roll cost;
a cost per occurrence of move ins and move outs;
a plurality of grid components, further comprising at least two of:
an advanced metering infrastructure (AMI), an outage management system (OMS), a distribution management system (DMS), a geographic information system (GIS), a customer information system (CIS), an interactive voice response (IVR) system, a power plant component, a gas processing plant component, a water processing plant component, an electrical distribution grid component, a water distribution grid component, a gas distribution grid component and a utility control center component; and a first suite of offerings and a second suite of offerings of a plurality of energy offerings from one or more manufacturers or service providers;

compute, by a processor, costs of the customer acquiring the first suite of offerings and to compute the costs of the customer acquiring the second suite of offerings by:

multiplying each of a market pricing of an application of each of the plurality of grid components by an integration factor related to each of their installation to calculate a cost with integration for each of the plurality of grid components;

dividing the cost with integration for each of the plurality of grid components by the total number of endpoints to compute a cost per meter;

multiplying the cost with integration for each of the plurality of the grid components with an annual support rate percentage for each of the grid components, divided by twelve months, and further divided by the total number of endpoints, to compute an annual support per meter per month;

summing the cost per meter by the annual support per meter per month to calculate a total per meter investment;

computing, using the total per meter investment and the total number of endpoints, a total investment for each of the plurality of grid components;

summing each of the market pricing of the application of each of the plurality of grid components to calculate a total technology cost;

summing the cost with integration for each of the plurality of grid components to calculate a total cost with integration;

multiplying a percent refreshment rate to the total technology cost to compute a cost of refreshing current technology;

computing a technology refreshment cost spread over time using the cost of refreshing current technology;

summing the technology refreshment cost spread over time and the total cost with integration to compute a total cost of ownership;

dividing the total cost of ownership by the total number of endpoints and further by the twelve months to compute a total cost of ownership per meter cost;

multiplying a personnel count by a labor cost to compute a total labor cost;

dividing the total labor cost by the twelve months and by the total number of endpoints to compute a cost of labor avoided per month per meter by using the second suite of offerings;

adding the total cost of ownership per meter cost to the cost of labor avoided per month per meter to compute a total cost of ownership per meter per month; and multiplying the total cost of ownership per meter per month by the total number of endpoints to compute a total cost of ownership per month;

compute, by the processor, a revenue generated by the customer acquiring the first suite of offerings and compute the revenue generated by the customer acquiring the second suite of offerings by:

multiplying the monthly disconnect rate by endpoint type with the total number of endpoints by endpoint type to compute a total number of meters by endpoint type disconnected per month;

multiplying the total number of meters by endpoint type disconnected per month with the prepay monthly disconnect rate reduction by endpoint type to compute a monthly disconnect rate reduction;

subtracting the monthly disconnect rate reduction from the total number of meters by endpoint type disconnected per month, and multiplying by the average bill by endpoint type, and dividing by the total number of endpoints by endpoint type to calculate a revenue improvement per meter per month;

multiplying the average bill by endpoint type with the total number of endpoints by endpoint type to compute a total monthly revenue;

multiplying the truck roll cost by an avoided track roll monthly occurrence to compute a monthly track roll costs avoidance;

dividing the monthly track roll costs avoidance by the total number of endpoints by endpoint type to compute an avoidance of truck rolls per meter per month;

multiplying the cost per occurrence of move ins and move outs with a number of move ins and move outs prevented and dividing by the total number of endpoints by endpoint type to compute a percent prevention of move ins and move outs per month;

multiplying a theft caught by prepay loss by endpoint type with the total monthly service revenue by endpoint type and dividing by a theft rate prevented by prepayment value to calculate a loss prevention benefit; and dividing the loss prevention benefit by the total number of endpoints by endpoint type to calculate a per meter theft prevention benefit;

calculate, by the processor, an as-is net revenue that does not include costs of the customer acquiring the first suite of offerings or the customer acquiring the second suite of offerings;

calculate, by the processor, a capital expenditure net revenue by subtracting the costs of the customer acquiring the first suite of offerings from the revenue generated by the customer acquiring the first suite of offerings;

calculate, by the processor, a grid intelligence quotient net revenue by subtracting the costs of the customer acquiring the second suite of offerings from the revenue generated by the customer acquiring the second suite of offerings;

compute, by the processor, an as-is cumulative revenue, a capital expenditure cumulative revenue and a grid intelligence quotient cumulative revenue from each of the as-is net revenue, the capital expenditure net revenue and the grid intelligence quotient net revenue; and display, by the processor, each of the as-is cumulative revenue, the capital expenditure cumulative revenue and the grid intelligence quotient cumulative revenue as a textual representation, a graphical representation, or a combination thereof, of cumulative revenue against time for analyzing economic differences of the customer implementing the first plurality of offerings, the customer implementing the second plurality of offerings or the customer not implementing any of the first plurality of offerings or the second plurality of offerings.

9. The non-transitory machine readable media of claim 8, wherein the instructions are configured to be executable by a website.

10. The non-transitory machine readable media of claim 8, wherein the instructions are configured to be executable by a spreadsheet.

11. The non-transitory machine readable media of claim 8, wherein the plurality of grid components comprise only two of: the advanced metering infrastructure (AMI) input, the outage management system (OMS), the distribution management system (DMS), the geographic information system (GIS), the customer information system (CIS), the interactive voice response (IVR) system, the power plant component, the gas plant component, the water plant component, the electrical distribution grid component, the water distribution grid component, the gas distribution grid component, or the utility control center component.

12. The non-transitory machine readable media of claim 8, wherein the grid components are provided by a single manufacturer.

13. The non-transitory machine readable media of claim 8, wherein the grid components are provided by a plurality of manufacturers.

14. A method comprising:
  receiving customer information, the customer information further comprising:
    a customer name of the customer;
    a contract start date;
    a contract term;
    a cost to deploy a service vehicle;
    a plurality of endpoint types, further comprising at least one of an electric endpoint type, a water endpoint type and a gas endpoint type;
    a total number of endpoints by endpoint type;
    a monthly disconnect rate by endpoint type;
    a prepay monthly disconnect rate reduction for each endpoint type;
    an average bill by endpoint type;
    a total monthly service revenue by endpoint type;
    a truck roll cost;
    a cost per occurrence of move ins and move outs;
    a plurality of grid components, further comprising at least two of:
    an advanced metering infrastructure (AMI), an outage management system (OMS), a distribution management system (DMS), a geographic information system (GIS), a customer information system (CIS), an interactive voice response (IVR) system, a power plant component, a gas processing plant component, a water processing plant component, an electrical distribution grid component, a water distribution grid component, a gas distribution grid component and a utility control center component; and
    a first suite of offerings and a second suite of offerings of a plurality of energy offerings from one or more manufacturers or service providers;
  computing, by a processor, costs of the customer acquiring the first suite of offerings and to compute the costs of the customer acquiring the second suite of offerings by:
    multiplying each of a market pricing of an application of each of the plurality of grid components by an integration factor related to each of their installation to calculate a cost with integration for each of the plurality of grid components;
    dividing the cost with integration for each of the plurality of grid components by the total number of endpoints to compute a cost per meter;
    multiplying the cost with integration for each of the plurality of the grid components with an annual support rate percentage for each of the grid components, divided by twelve months, and further divided by the total number of endpoints, to compute an annual support per meter per month;
    summing the cost per meter by the annual support per meter per month to calculate a total per meter investment;
    computing, using the total per meter investment and the total number of endpoints, a total investment for each of the plurality of grid components;
    summing each of the market pricing of the application of each of the plurality of grid components to calculate a total technology cost;
    summing the cost with integration for each of the plurality of grid components to calculate a total cost with integration;
    multiplying a percent refreshment rate to the total technology cost to compute a cost of refreshing current technology;
    computing a technology refreshment cost spread over time using the cost of refreshing current technology;
    summing the technology refreshment cost spread over time and the total cost with integration to compute a total cost of ownership;
    dividing the total cost of ownership by the total number of endpoints and further by the twelve months to compute a total cost of ownership per meter cost;
    multiplying a personnel count by a labor cost to compute a total labor cost;
    dividing the total labor cost by the twelve months and by the total number of endpoints to compute a cost of labor avoided per month per meter by using the second suite of offerings;
    adding the total cost of ownership per meter cost to the cost of labor avoided per month per meter to compute a total cost of ownership per meter per month; and
    multiplying the total cost of ownership per meter per month by the total number of endpoints to compute a total cost of ownership per month;
  computing, by the processor, a revenue generated by the customer acquiring the first suite of offerings and computing the revenue generated by the customer acquiring the second suite of offerings by:
    multiplying the monthly disconnect rate by endpoint type with the total number of endpoints by endpoint type to compute a total number of meters by endpoint type disconnected per month;
    multiplying the total number of meters by endpoint type disconnected per month with the prepay monthly disconnect rate reduction by endpoint type to compute a monthly disconnect rate reduction;
    subtracting the monthly disconnect rate reduction from the total number of meters by endpoint type disconnected per month, and multiplying by the average bill by endpoint type, and dividing by the total number of endpoints by endpoint type to calculate a revenue improvement per meter per month;

multiplying the average bill by endpoint type with the total number of endpoints by endpoint type to compute a total monthly revenue;

multiplying the truck roll cost by an avoided track roll monthly occurrence to compute a monthly track roll costs avoidance;

dividing the monthly track roll costs avoidance by the total number of endpoints by endpoint type to compute an avoidance of truck rolls per meter per month;

multiplying the cost per occurrence of move ins and move outs with a number of move ins and move outs prevented and dividing by the total number of endpoints by endpoint type to compute a percent prevention of move ins and move outs per month;

multiplying a theft caught by prepay loss by endpoint type with the total monthly service revenue by endpoint type and dividing by a theft rate prevented by prepayment value to calculate a loss prevention benefit; and dividing the loss prevention benefit by the total number of endpoints by endpoint type to calculate a per meter theft prevention benefit;

calculating, by the processor, an as-is net revenue that does not include costs of the customer acquiring the first suite of offerings or the customer acquiring the second suite of offerings;

calculating, by the processor, a capital expenditure net revenue by subtracting the costs of the customer acquiring the first suite of offerings from the revenue generated by the customer acquiring the first suite of offerings;

calculating, by the processor, a grid intelligence quotient net revenue by subtracting the costs of the customer acquiring the second suite of offerings from the revenue generated by the customer acquiring the second suite of offerings;

computing, by the processor, an as-is cumulative revenue, a capital expenditure cumulative revenue and a grid intelligence quotient cumulative revenue from each of the as-is net revenue, the capital expenditure net revenue and the grid intelligence quotient net revenue; and displaying, by the processor, each of the as-is cumulative revenue, the capital expenditure cumulative revenue and the grid intelligence quotient cumulative revenue as a textual representation, a graphical representation, or a combination thereof, of cumulative revenue against time for analyzing economic differences of the customer implementing the first plurality of offerings, the customer implementing the second plurality of offerings or the customer not implementing any of the first plurality of offerings or the second plurality of offerings.

15. The method of claim 14, wherein the method is executed by utilizing a website.

16. The method of claim 14, wherein the method is executed by utilizing a spreadsheet.

17. The method of claim 14, wherein the plurality of grid components comprise only two of: the advanced metering infrastructure (AMI), the outage management system (OMS), the distribution management system (DMS), the geographic information system (GIS), the customer information system (CIS), the interactive voice response (IVR) system, the power plant component, the gas plant component, the water plant component, the electrical distribution grid component, the water distribution grid component, the gas distribution grid component or the utility control center component.

* * * * *